(12) United States Patent
Mukae

(10) Patent No.: US 12,344,405 B2
(45) Date of Patent: Jul. 1, 2025

(54) SATELLITE CONSTELLATION FORMING SYSTEM, SATELLITE CONSTELLATION FORMING METHOD, GROUND FACILITY, AND BUSINESS DEVICE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 200 days.

(21) Appl. No.: 17/792,406

(22) PCT Filed: Mar. 9, 2021

(86) PCT No.: PCT/JP2021/009113
§ 371 (c)(1),
(2) Date: Jul. 13, 2022

(87) PCT Pub. No.: WO2021/182427
PCT Pub. Date: Sep. 16, 2021

(65) Prior Publication Data
US 2023/0056948 A1 Feb. 23, 2023

(30) Foreign Application Priority Data
Mar. 10, 2020 (JP) .................. 2020-040881

(51) Int. Cl.
*B64G 1/10* (2006.01)
*B64G 1/24* (2006.01)
(Continued)

(52) U.S. Cl.
CPC .......... *B64G 1/1085* (2013.01); *B64G 1/242* (2013.01); *B64G 1/2429* (2023.08); *B64G 1/62* (2013.01);
(Continued)

(58) Field of Classification Search
CPC .. B64G 1/1085; B64G 7/18513; B64G 1/244; B64G 1/68; B64G 1/242; B64G 1/62; B64G 1/66; B64G 3/00
See application file for complete search history.

(56) References Cited

U.S. PATENT DOCUMENTS 6,050,525 A * 4/2000 Drake .................... H04B 7/195
455/12.1
10,807,739 B1 * 10/2020 Hawkins .............. B64G 1/1085
(Continued)

FOREIGN PATENT DOCUMENTS

EP 1795445 A1 6/2007
JP 2017-114159 A 6/2017

OTHER PUBLICATIONS

International Search Report and Written Opinion mailed on May 18, 2021, received for PCT Application PCT/JP2021/009112, filed on Mar. 9, 2021, 8 pages including English Translation.
(Continued)

*Primary Examiner* — Joshua D Huson
*Assistant Examiner* — Vicente Rodriguez
(74) *Attorney, Agent, or Firm* — XSENSUS LLP

(57) ABSTRACT

A satellite constellation forming system (600) forms a satellite constellation which is composed of a satellite group that cooperatively provides a communication service, and has a plurality of orbital planes in each of which a plurality of satellites fly at the same orbital altitude. Each satellite of the satellite group includes inter-satellite communication means and satellite-ground communication means. A satellite constellation forming unit (11) forms the satellite constellation which has ten or more orbital planes with different normal directions, and in which at least one relative angle in an azimuth direction of adjacent orbital planes of the plurality of orbital planes is arranged to be uneven and satellite-ground communication means of satellites flying in orbital
(Continued)

planes spaced unevenly have a communication range that achieves complete ground coverage above the equator.

17 Claims, 25 Drawing Sheets

(51) Int. Cl.
    *B64G 1/62*     (2006.01)
    *H04B 7/185*     (2006.01)

(52) U.S. Cl.
    CPC ......... *H04B 7/18513* (2013.01); *B64G 1/244* (2019.05)

(56) References Cited

U.S. PATENT DOCUMENTS

| | | | | |
|---|---|---|---|---|
| 10,843,822 | B1* | 11/2020 | Herman | B64G 1/1085 |
| 11,104,456 | B2* | 8/2021 | Schilling | B64G 1/285 |
| 2018/0022474 | A1* | 1/2018 | Meek | B64G 1/1007 244/158.4 |
| 2018/0370658 | A1 | 12/2018 | Amimoto et al. | |
| 2019/0181946 | A1* | 6/2019 | Wendling | H04B 7/18513 |

OTHER PUBLICATIONS

International Search Report and Written Opinion mailed on Jun. 1, 2021, received for PCT Application PCT/JP2021/009113, filed on Mar. 9, 2021, 8 pages including English Translation.
Office Action issued Nov. 29, 2022 in Japanese Patent Application No. 2022-507199, 5 pages.
Office Action issued Apr. 22, 2025 for co-pending U.S. Appl. No. 17/792,402.
Hawkins et al., "Flight Dynamics Operations and Collision Avoidance For The Skysat Imaging Constellation", 9th International Workshop on Satellite Constellations & Formation Flying (IWSCFF), IWSCFF Jun. 5-17, 2017, pp. 1-19. (Year: 2017).

* cited by examiner

SATELLITE CONSTELLATION FORMING SYSTEM, SATELLITE CONSTELLATION FORMING METHOD, GROUND FACILITY, AND BUSINESS DEVICE

CROSS-REFERENCE TO RELATED APPLICATIONS

The present application is based on PCT filing PCT/JP2021/009113, filed Mar. 9, 2021, which claims priority to JP 2020-040881, filed Mar. 10, 2020. This application is also related to U.S. patent application Ser. Number. 17/792,402, entitled SATELLITE CONSTELLATION FORMING SYSTEM, SATELLITE CONSTELLATION FORMING METHOD, GROUND FACILITY, BUSINESS DEVICE, AND OPEN ARCHITECTURE DATA REPOSITORY, filed July 13, 2022. The entire contents of each are incorporated herein by reference.

TECHNICAL FIELD

The present disclosure relates to a satellite constellation forming system, a satellite constellation forming method, a satellite constellation forming program, a ground facility, and a business device.

BACKGROUND ART

In recent years, large-scale satellite constellations including several hundred to several thousand satellites, which are called mega-constellations, have started to be constructed, and the risk of collision between satellites in orbit is increasing. In addition, space debris such as an artificial satellite that has become uncontrollable due to a failure or rocket debris has been increasing.

With the rapid increase in space objects such as satellites and space debris in outer space as described above, in space traffic management (STM) there is an increasing need to create international rules for avoiding collisions between space objects.

In particular, there is a plan to build a mega-constellation composed of a satellite group of several thousand satellites in the vicinity of an orbital altitude of 340 km. On the other hand, a space object such as the International Space Station (ISS) is normally flying at an orbital altitude of about 400 km, which is higher than the vicinity of an orbital altitude of 340 km. In the process of making such a space object deorbit and enter the atmosphere, it is always necessary to pass through the altitude at which the mega-constellation is flying.

Patent Literature 1 discloses a technology for forming a satellite constellation composed of a plurality of satellites in the same circular orbit.

CITATION LIST

Patent Literature

Patent Literature 1: JP 2017-114159 A

SUMMARY OF INVENTION

Technical Problem

When a space object flying at an altitude higher than the altitude of a satellite constellation that is a mega-constellation is made to deorbit and enter the atmosphere, this space object needs to pass through the orbital altitude of the satellite constellation. At this time, there is a risk that the space object may collide with a satellite in the mega-constellation.

However, Patent Literature 1 does not describe a collision avoidance method for a case in which a large-scale space object intrudes into a satellite constellation.

An object of the present disclosure is to reduce a risk of collision between a space object and a satellite constellation.

Solution to Problem

A satellite constellation forming system according to the present disclosure forms a satellite constellation which is composed of a satellite group and in which the satellite group cooperatively provides a communication service, the satellite constellation having a plurality of orbital planes in each of which a plurality of satellites fly at a same orbital altitude, wherein each satellite of the satellite group includes inter-satellite communication means and satellite-ground communication means, and the satellite constellation forming system includes a satellite constellation forming unit to form the satellite constellation which has ten or more orbital planes with different normal directions, and in which at least one relative angle in an azimuth direction of adjacent orbital planes of the plurality of orbital planes is arranged to be uneven and satellite-ground communication means of satellites flying in orbital planes spaced unevenly have a communication range that achieves complete ground coverage above the equator.

Advantageous Effects of Invention

A satellite constellation forming system according to the present disclosure forms a passage region for a space object to pass through at an orbital altitude of a satellite constellation, so that a risk of collision between a large-scale space object and the satellite constellation can be reduced.

DESCRIPTION OF EMBODIMENTS

Figure 1:
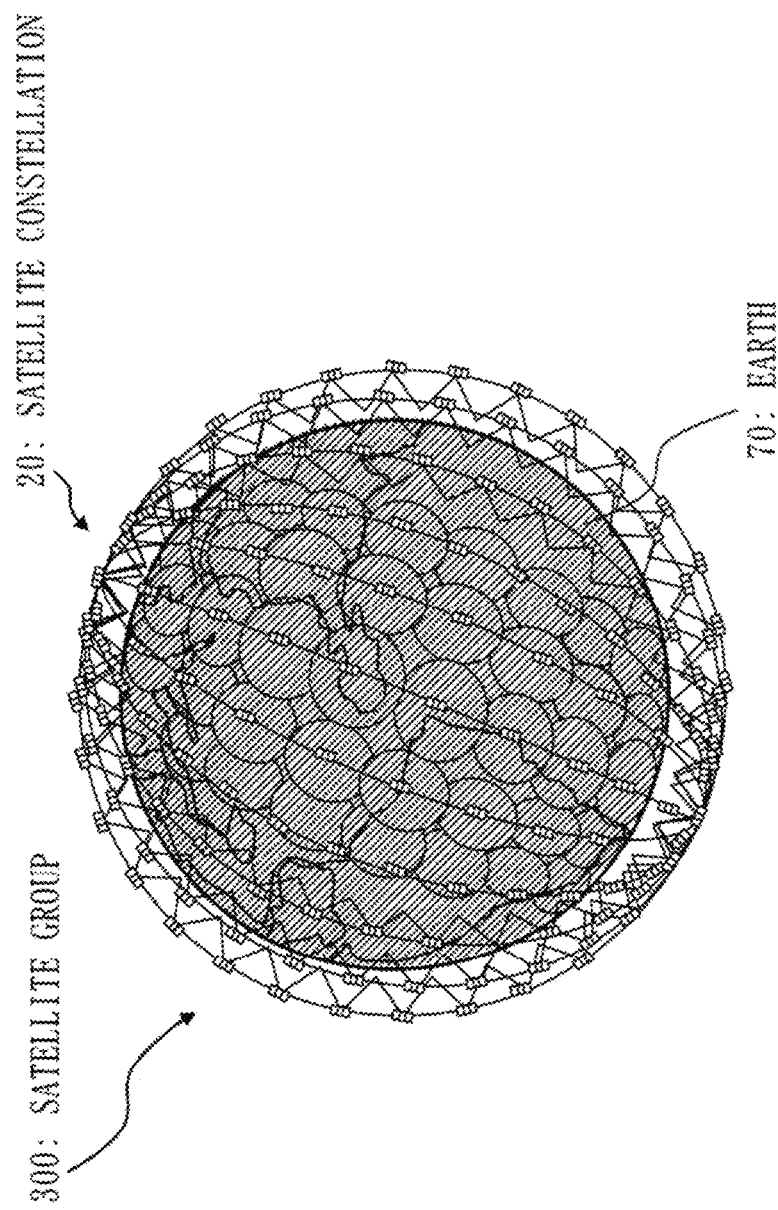
FIG. 1 is an example in which a plurality of satellites cooperatively realize a communication service to the ground over the entire globe of Earth.

Embodiments of the present disclosure will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

*Description of Configurations*

An example of a configuration of a satellite constellation forming system according to the following embodiments will be described.

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner. By providing adjacent orbital planes, a communication service can be provided to the ground with widespread coverage across the adjacent orbits. Similarly, by placing a large number of orbital planes at approximately equal intervals around Earth, a communication service to the ground can be provided over the entire globe.

Figure 2:
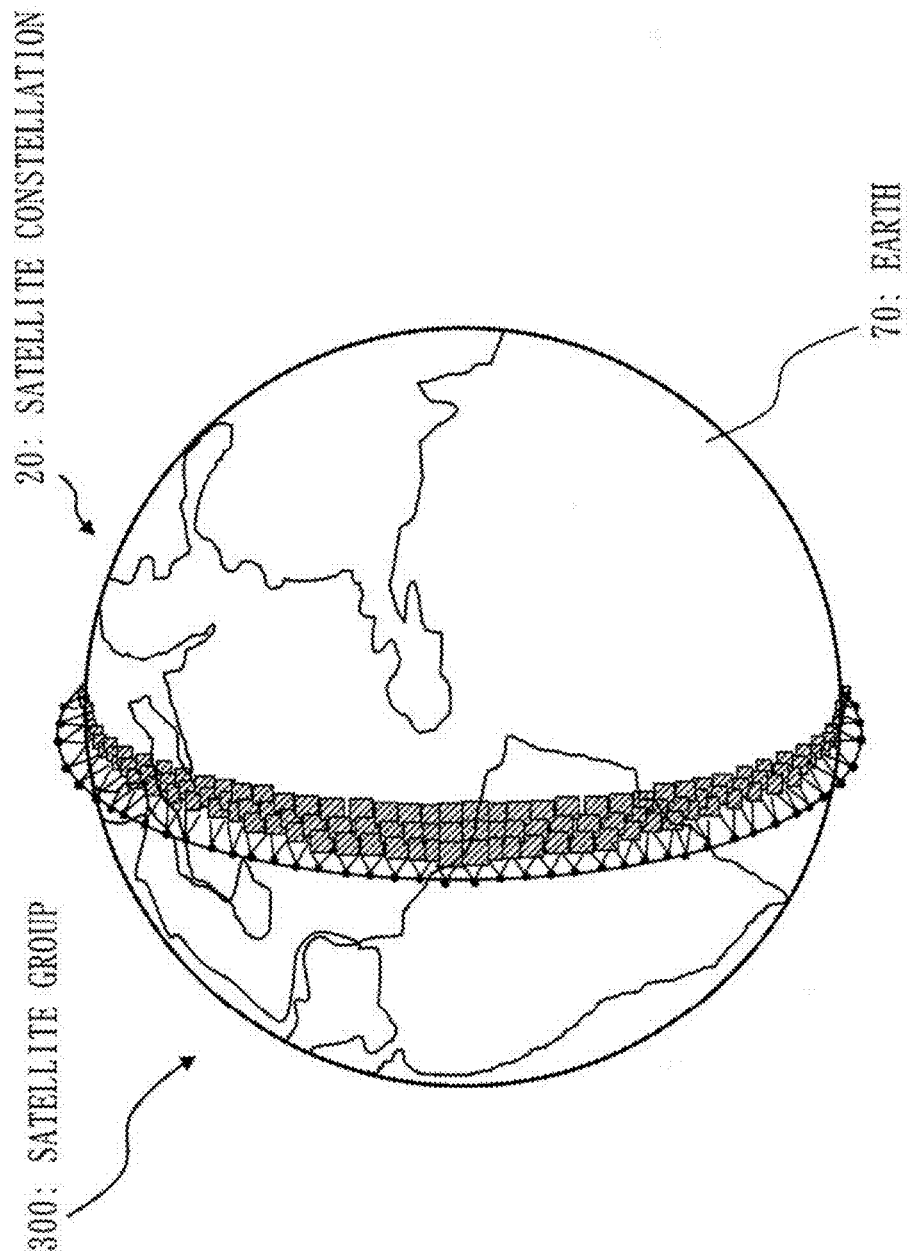
FIG. 2 is an example in which a plurality of satellites in a single orbital plane realize an Earth observation service.

FIG. 2 is a diagram illustrating an example in which a plurality of satellites in a single orbital plane realize an Earth observation service.

FIG. 2 illustrates a satellite constellation 20 that realizes an Earth observation service. In the satellite constellation 20 of FIG. 2, satellites each equipped with an Earth observation device, which is an optical sensor or a radio sensor such as synthetic-aperture radar, fly at the same altitude in the same orbital plane. In this way, in a satellite group 300 in which the ground imaging ranges of successive satellites overlap in a time-delay manner, a plurality of satellites in orbit provide an Earth observation service by capturing ground images in turn in a time-division manner.

As described above, the satellite constellation 20 is formed with the satellite group 300 composed of a plurality of satellites in each orbital plane. In the satellite constellation 20, the satellite group 300 cooperatively provides a service. Specifically, the satellite constellation 20 refers to a satellite constellation formed with one satellite group by a communications business service company as illustrated in FIG. 1 or an observation business service company as illustrated in FIG. 2.

Figure 3:
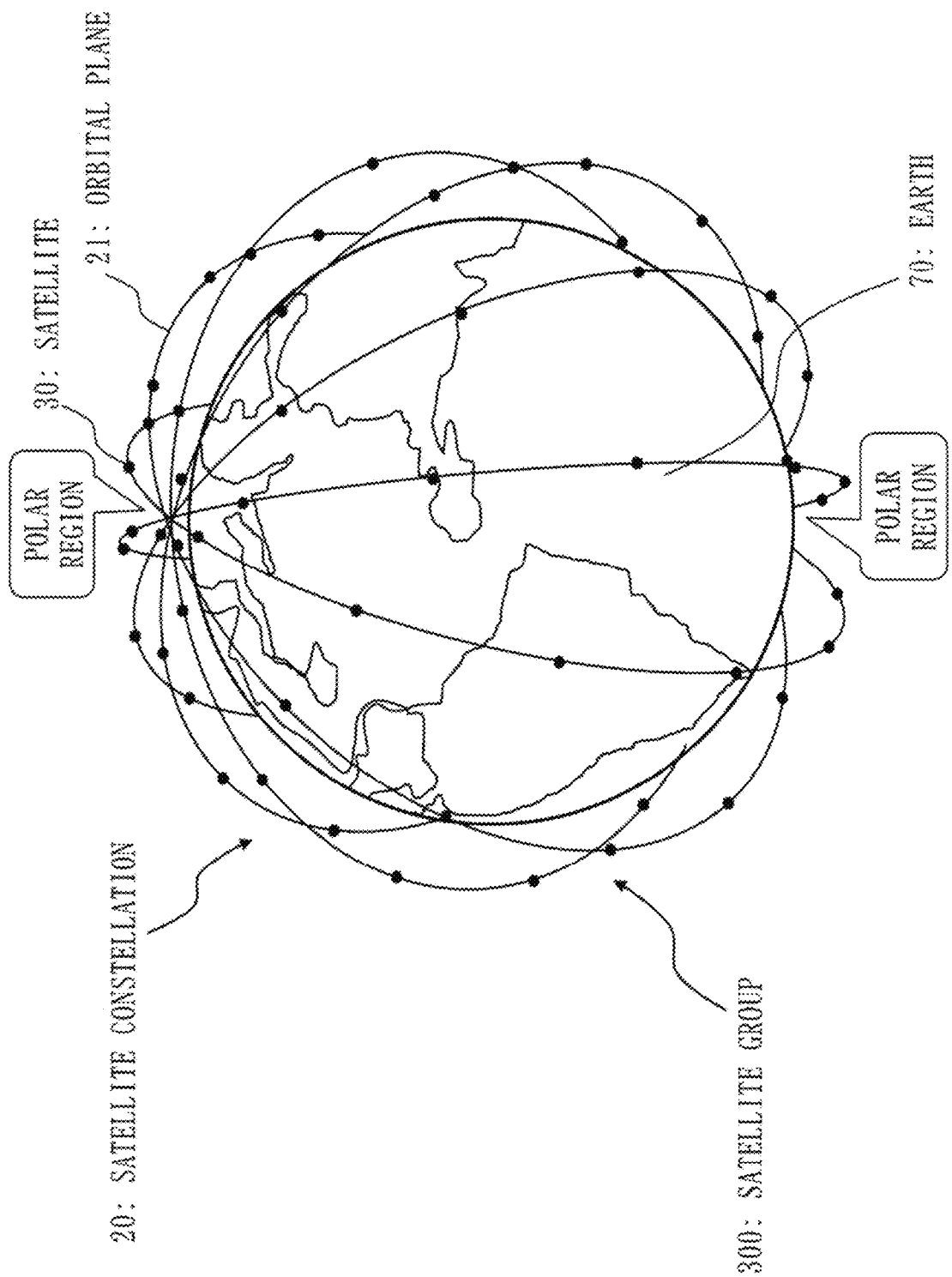
FIG. 3 is an example of a satellite constellation having a plurality of orbital planes that intersect in the vicinity of the polar regions.
Figure 4:
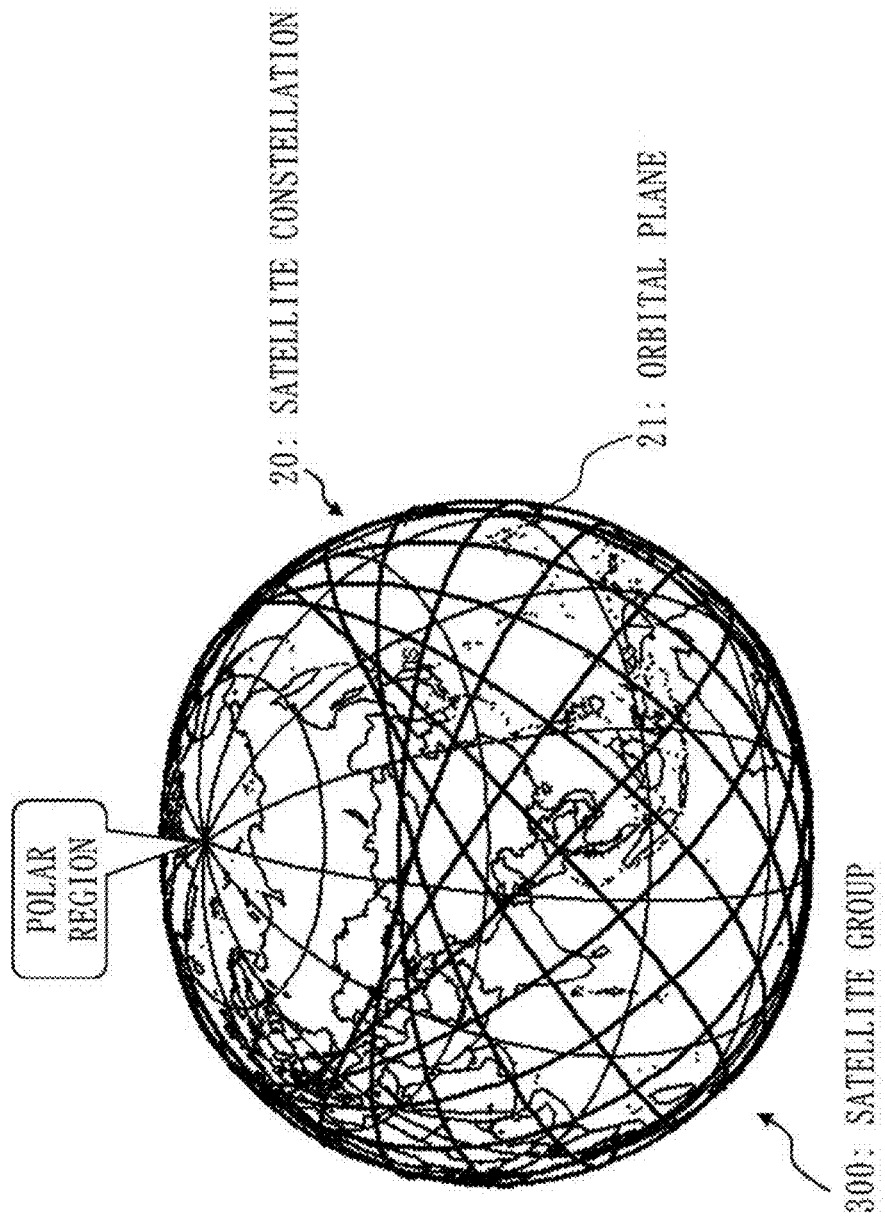
FIG. 4 is an example of a satellite constellation having a plurality of orbital planes that intersect outside the polar regions.

FIG. 3 is an example of a satellite constellation 20 having a plurality of orbital planes 21 that intersect in the vicinity of the polar regions. FIG. 4 is an example of a satellite constellation 20 having a plurality of orbital planes 21 that intersect outside the polar regions.

In the satellite constellation 20 of FIG. 3, the orbital inclination of each of the plurality of orbital planes 21 is about 90 degrees, and the orbital planes 21 exist on mutually different planes.

In the satellite constellation 20 of FIG. 4, the orbital inclination of each of the plurality of orbital planes 21 is not about 90 degrees, and the orbital planes 21 exist on mutually different planes.

In the satellite constellation 20 of FIG. 3, any given two orbital planes intersect at points in the vicinity of the polar regions. In the satellite constellation 20 of FIG. 4, any given two orbital planes intersect at points outside the polar regions. In FIG. 3, a collision between satellites 30 may occur in the vicinity of the polar regions. As illustrated in FIG. 4, the intersection points between the orbital planes each with an orbital inclination greater than 90 degrees move away from the polar regions according to the orbital inclination. Depending on the combinations of orbital planes, orbital planes may intersect at various locations including the vicinity of the equator. For this reason, places where collisions between satellites 30 may occur are diversified. A satellite 30 is referred to also as an artificial satellite.

In recent years, large-scale satellite constellations including several hundred to several thousand satellites have started to be constructed, and the risk of collision accidents between satellites in orbit is increasing. In addition, space debris such as an artificial satellite that has become uncontrollable due to a failure or rocket debris has been increasing. A large-scale satellite constellation is also called a mega-constellation. Such debris is also called space debris.

As described above, with the increase in debris in outer space and the rapid increase in the number of satellites such as those in a mega-constellation, the need for space traffic management (STM) is increasing.

There has been increasing need for deorbit after completion of a mission in a large-scale space object, such as the ISS, and a satellite or ADR, which causes debris such as a failed satellite or an upper stage of a rocket that is floating to deorbit by external means such as a debris removal satellite. International discussions have begun as STM on the need for such ADR. ADR is an abbreviation for Active Debris Removal.

Referring to FIGS. 5 to 8, an example of a satellite constellation forming system 600 that forms a satellite constellation 20, a satellite 30 and a ground facility 700 will now be described. For example, the satellite constellation forming system 600 is operated by a business operator that conducts a satellite constellation business, such as a mega-constellation business device, a low Earth orbit (LEO) constellation business device, or a satellite business device.

Figure 5:
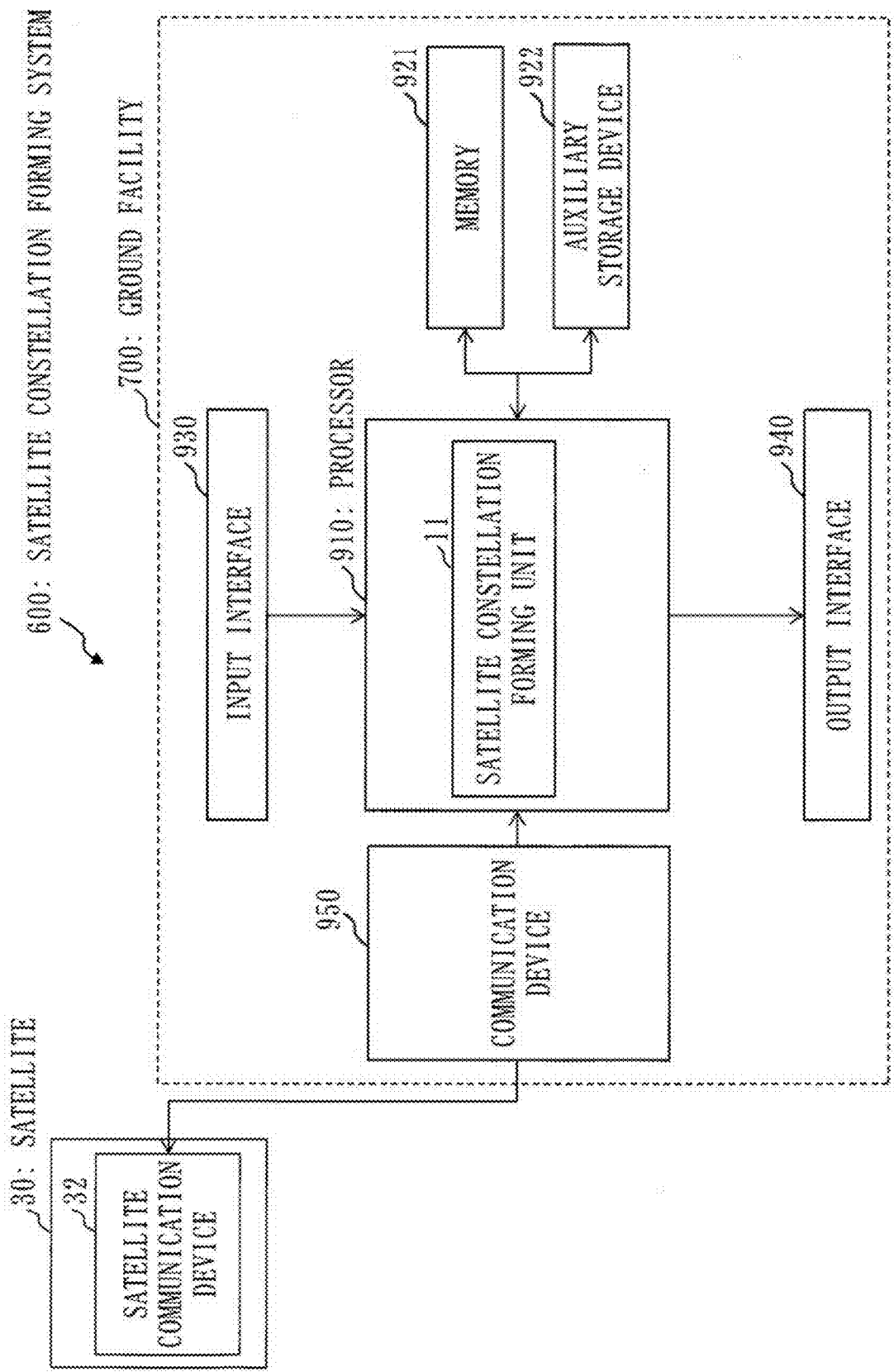
FIG. 5 is a configuration diagram of a satellite constellation forming system.

FIG. 5 is a configuration diagram of the satellite constellation forming system 600.

The satellite constellation forming system 600 includes a computer. FIG. 5 illustrates a configuration with one computer but, in practice, a computer is provided in each satellite 30 of a plurality of satellites constituting the satellite constellation 20 and the ground facility 700 that communicates with each satellite 30. The functions of the satellite constellation forming system 600 are realized cooperatively by the computers provided in each of the satellites 30 and the ground facility 700 that communicates with the satellites 30. In the following, an example of a configuration of the computer that realizes the functions of the satellite constellation forming system 600 will be described.

The satellite constellation forming system 600 includes the ground facility 700 that communicates with the satellite 30. The satellite 30 includes a satellite communication device 32 that communicates with a communication device 950 of the ground facility 700. Among the components included in the satellite 30, the satellite communication device 32 is illustrated in FIG. 5.

The satellite constellation forming system 600 includes a processor 910, and also includes other hardware components such as a memory 921, an auxiliary storage device 922, an input interface 930, an output interface 940, and a communication device 950. The processor 910 is connected with other hardware components via signal lines and controls these other hardware components.

The satellite constellation forming system 600 includes a satellite constellation forming unit 11 as a functional element. The satellite constellation forming unit 11 controls formation of the satellite constellation 20 while communicating with the satellite 30.

The functions of the satellite constellation forming unit 11 are realized by software.

The processor 910 is a device that executes a satellite constellation forming program. The satellite constellation forming program is a program that realizes the functions of the satellite constellation forming unit 11.

The processor 910 is an integrated circuit (IC) that performs operational processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable recording medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of a display device such as a display is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC).

The satellite constellation forming program is read into the processor 910 and executed by the processor 910. The memory 921 stores not only the satellite constellation forming program but also an operating system (OS). The processor 910 executes the satellite constellation forming program while executing the OS. The satellite constellation forming program and the OS may be stored in the auxiliary storage device 922. The satellite constellation forming program and the OS that are stored in the auxiliary storage device 922 are loaded into the memory 921 and executed by the processor 910. Part or the entirety of the satellite constellation forming program may be embedded in the OS.

The satellite constellation forming system 600 may include a plurality of processors as an alternative to the processor 910. These processors share the execution of programs. Each of the processors is, like the processor 910, a device that executes programs.

Data, information, signal values, and variable values that are used, processed, or output by programs are stored in the memory 921 or the auxiliary storage device 922, or stored in a register or a cache memory in the processor 910.

"Unit" of each unit of the satellite constellation forming system may be interpreted as "process", "procedure", "means", "phase", or "step". "Process" of the satellite constellation forming process may be interpreted as "program", "program product", or "computer readable storage medium recording a program". The terms "process", "procedure", "means", "phase", and "step" may be interpreted interchangeably.

The satellite constellation forming program causes a computer to execute each process, each procedure, each means, each phase, or each step, where "unit" of each unit of the satellite constellation forming system is interpreted as "process", "procedure", "means", "phase", or "step". A satellite constellation forming method is a method performed by execution of the satellite constellation forming program by the satellite constellation forming system 600.

The satellite constellation forming program may be stored and provided in a computer readable storage medium. Alternatively, each program may be provided as a program product.

Figure 6:
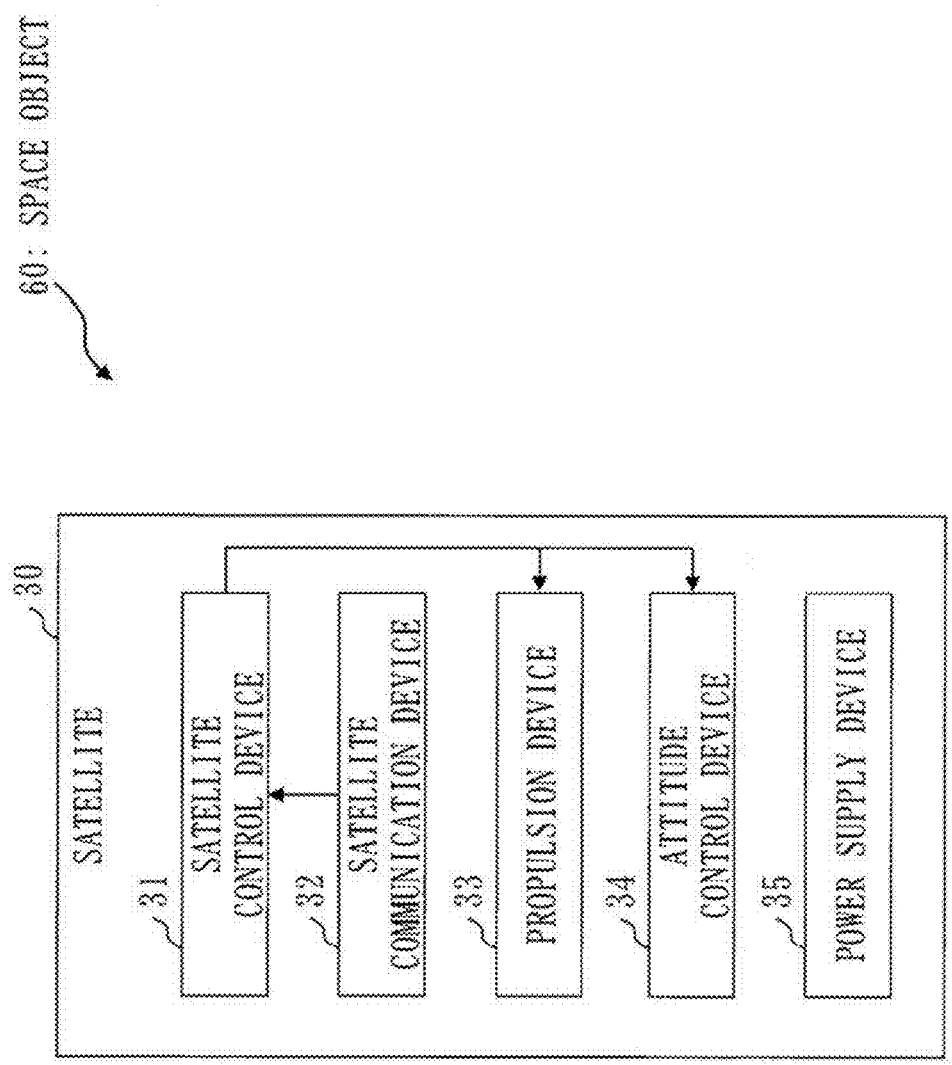
FIG. 6 is a configuration diagram of a satellite of the satellite constellation forming system.

FIG. 6 is a configuration diagram of the satellite 30 of the satellite constellation forming system 600.

The satellite 30 includes a satellite control device 31, the satellite communication device 32, a propulsion device 33, an attitude control device 34, and a power supply device 35. Although other constituent elements that realize various functions are included, the satellite control device 31, the satellite communication device 32, the propulsion device 33, the attitude control device 34, and the power supply device 35 will be described in FIG. 6. The satellite 30 is an example of a space object 60.

The satellite control device 31 is a computer that controls the propulsion device 33 and the attitude control device 34 and includes a processing circuit. Specifically, the satellite control device 31 controls the propulsion device 33 and the attitude control device 34 in accordance with various commands transmitted from the ground facility 700.

The satellite communication device 32 includes inter-satellite communication means and satellite-ground communication means.

The inter-satellite communication means is a device to communicate between satellites of the plurality of satellites constituting the satellite constellation 20.

The satellite-ground communication means is a device to communicate with the ground facility 700. Specifically, the satellite communication device 32 transmits various types of data related to the satellite itself to the ground facility 700. The satellite communication device 32 also receives various commands transmitted from the ground facility 700.

The propulsion device 33 is a device that provides thrust force to the satellite 30 to change the velocity of the satellite 30. Specifically, the propulsion device 33 is an apogee kick motor, a chemical propulsion device, or an electric propulsion device. The apogee keck motor (AKM) is an upper-stage propulsion device used for orbital insertion of an artificial satellite, and is also called an apogee motor (when a solid rocket motor is used) or an apogee engine (when a liquid engine is used).

The chemical propulsion device is a thruster using mono-propellant or bipropellant fuel. The electric propulsion device is an ion engine or a Hall thruster. The apogee kick motor is the name of a device used for orbital transfer and may be a type of chemical propulsion device.

The attitude control device 34 is a device to control the attitude of the satellite 30 and attitude elements, such as the angular velocity and the line of sight, of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator in accordance with measurement data of the attitude sensor or various commands from the ground facility 700.

The power supply device 35 includes equipment such as a solar cell, a battery, and an electric power control device, and provides electric power to each piece of equipment installed in the satellite 30.

The processing circuit included in the satellite control device 31 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit. FPGA is an abbreviation for Field Programmable Gate Array.

Figure 7:
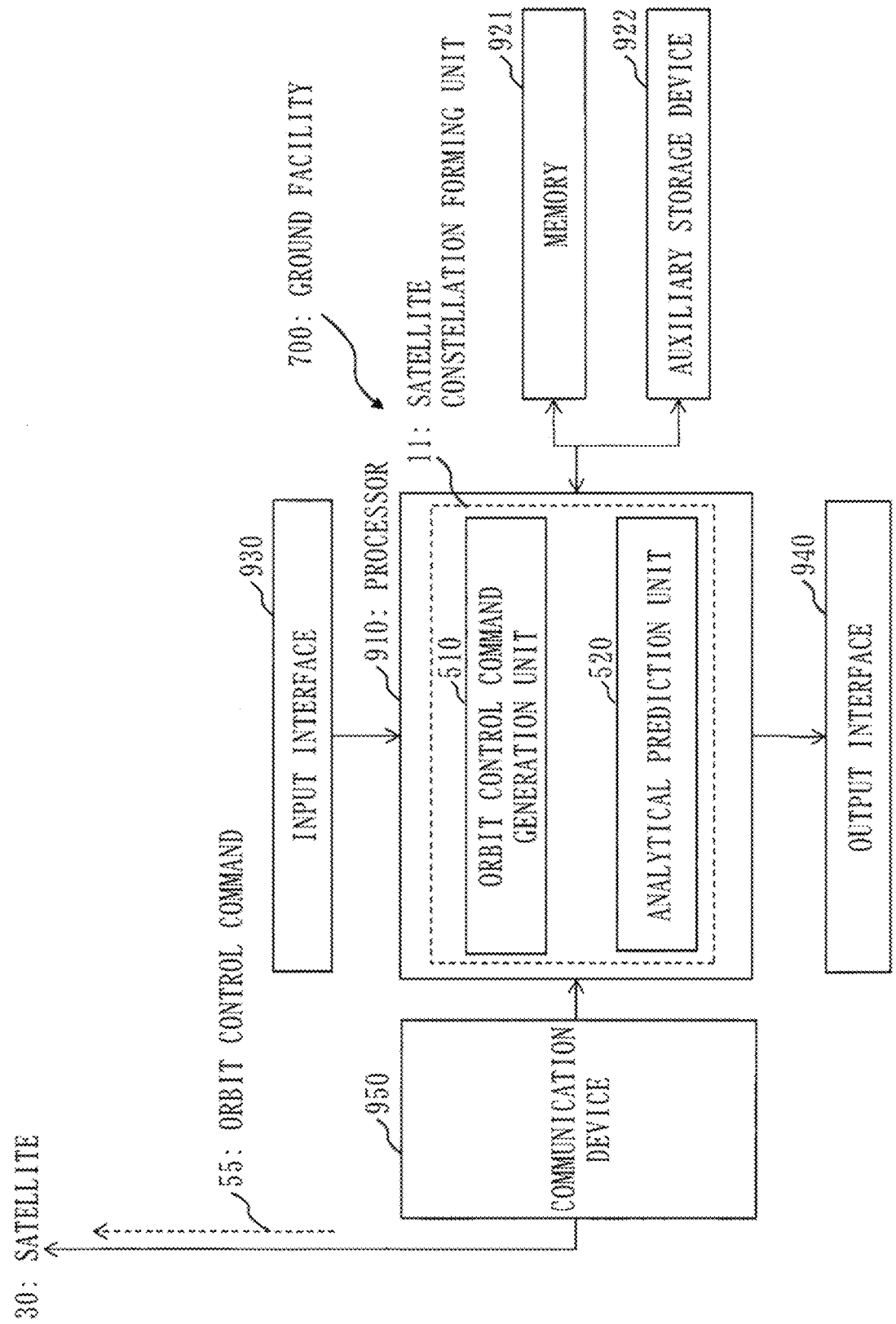
FIG. 7 is a configuration diagram of a ground facility of the satellite constellation forming system.

FIG. 7 is a configuration diagram of the ground facility 700 included in the satellite constellation forming system 600.

The ground facility 700 controls a large number of satellites in all orbital planes by programs. The ground facility 700 is an example of a ground device. The ground device is composed of a ground station, such as a ground antenna device, a communication device connected to a ground antenna device, or an electronic computer, and a ground facility as a server or terminal connected with the ground station via a network. The ground device may include a communication device installed in a mobile object such as an airplane, a self-driving vehicle, or a mobile terminal.

The ground facility 700 forms the satellite constellation 20 by communicating with each satellite 30. The ground facility 700 is provided in the satellite constellation forming system 600. The ground facility 700 includes a processor 910 and also includes other hardware components such as a memory 921, an auxiliary storage device 922, an input interface 930, an output interface 940, and a communication device 950. The processor 910 is connected with other hardware components via signal lines and controls these other hardware components. The hardware components of the ground facility 700 are substantially the same as the hardware components of the satellite constellation forming system 600 described with reference to FIG. 5.

The ground facility 700 includes an orbit control command generation unit 510 and an analytical prediction unit 520 as functional elements. The functions of the orbit control command generation unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 55 to each satellite 30.

The analytical prediction unit 520 performs analytical prediction on the orbit of the satellite 30.

The orbit control command generation unit 510 generates an orbit control command 55 to be transmitted to the satellite 30.

The orbit control command generation unit 510 and the analytical prediction unit 520 realize the functions of the satellite constellation forming unit 11. That is, the orbit control command generation unit 510 and the analytical prediction unit 520 are examples of the satellite constellation forming unit 11.

Figure 8:
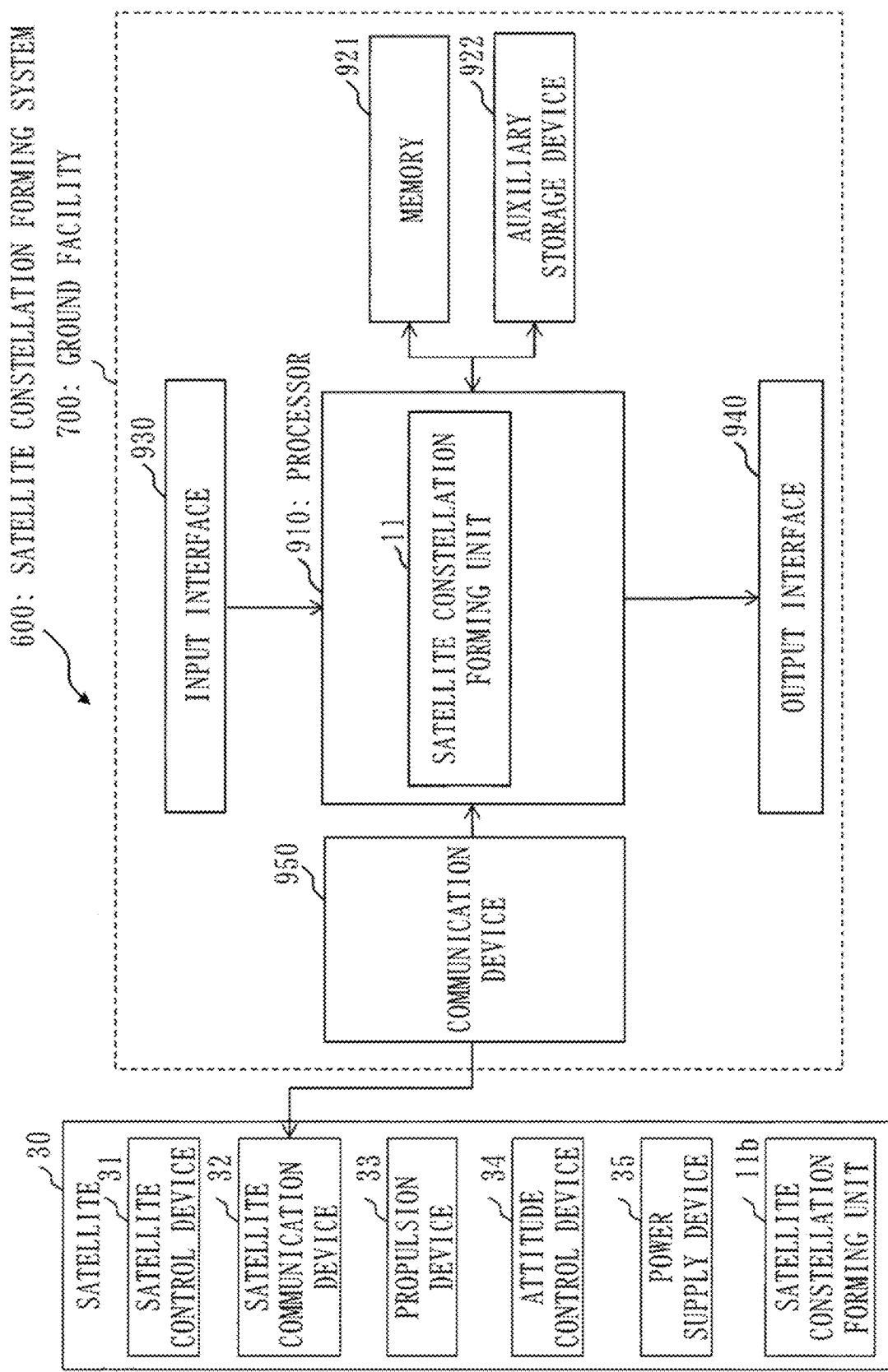
FIG. 8 is an example of a functional configuration of the satellite constellation forming system.

FIG. 8 is a diagram illustrating an example of a functional configuration of the satellite constellation forming system 600.

The satellite 30 further includes a satellite constellation forming unit 11b to form the satellite constellation 20. The functions of the satellite constellation forming system 600 are realized cooperatively by the satellite constellation forming unit 11b included in each satellite 30 of a plurality of satellites and the satellite constellation forming unit 11 included in the ground facility 700. The satellite constellation forming unit 11b of the satellite 30 may be included in the satellite control device 31.

*Description of Operation*

Figure 9:
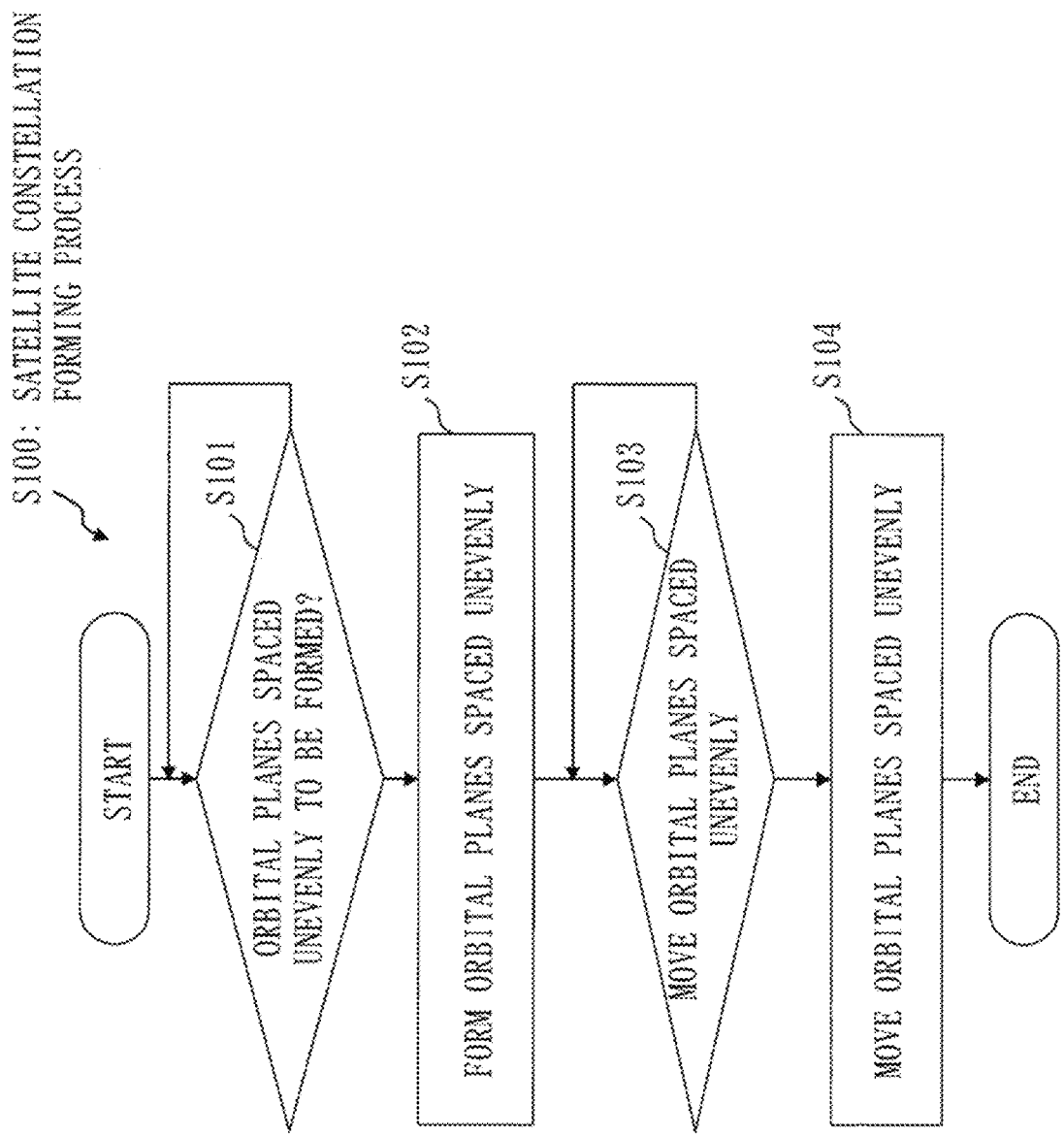
FIG. 9 is a flowchart of a satellite constellation forming process by the satellite constellation forming system according to Embodiment 1.

FIG. 9 is a flowchart of a satellite constellation forming process S100 by the satellite constellation forming system 600 according to this embodiment.

In this embodiment, the satellite constellation forming system 600 forms a satellite constellation 20 which is composed of a satellite group and in which the satellite group cooperatively provides a communication service. The satellite constellation forming system 600 forms the satellite constellation 20 having a plurality of orbital planes in each of which a plurality of satellites fly at the same orbital altitude. The satellite constellation 20 has ten or more orbital planes with different normal directions.

Each satellite of the satellite group includes inter-satellite communication means and satellite-ground communication means.

It is sufficient that the satellite constellation 20 has three or more orbital planes with different normal directions. The number of orbital planes may be any number, provided that the satellite constellation 20 can form a section where adjacent orbital planes have an even relative angle in an azimuth direction and a section where adjacent orbital planes have an uneven relative angle in the azimuth direction.

In step S101, the satellite constellation forming unit 11 determines whether the satellite constellation 20 in which orbital planes are spaced unevenly is to be formed. For example, when it is foreseen that a space object such as the ISS will pass through the orbital altitude of the satellite constellation from above the satellite constellation, it is determined that orbital planes spaced unevenly are to be formed. It is assumed that the satellite constellation forming system 600 has formed a mega-constellation composed of a satellite group of several thousand satellites in the vicinity of an orbital altitude of 340 km. It is also assumed that the ISS is flying at an orbital altitude of about 400 km. It is expected that the ISS will deorbit for PMD after completing its mission and descend toward the mega-constellation. The satellite constellation forming unit 11 determines whether the ISS, which is a large-scale space object, will pass through the orbital altitude of the mega-constellation from above the mega-constellation.

If it is determined that orbital planes spaced unevenly are to be formed, processing proceeds to step S102.

If it is not determined that orbital planes spaced unevenly are to be formed, step S101 is repeated.

In step S102, the satellite constellation forming unit 11 forms the satellite constellation 20 having ten or more orbital planes with different normal directions and having a plurality of orbital planes in which at least one relative angle in the azimuth direction between adjacent orbital planes is uneven. The satellite constellation forming unit 11 forms the satellite constellation 20 in which the satellite-ground communication means of satellites flying in orbital planes that are spaced unevenly have a communication range that completely covers the ground above the equator. Specifically, this is as described below.

Before a space object passes through the orbital altitude of the satellite constellation from above the satellite constellation, a passage region R for the space object to pass through is formed at the orbital altitude of the satellite constellation. The passage region R is a vacant region where adjacent orbital planes are spaced unevenly. The passage region R is, for example, a region where each orbital plane of the plurality of orbital planes does not exist or there are few intersection points between orbital planes. The passage region R is a region where the relative angle in the azimuth direction between adjacent orbital planes is uneven. The satellite constellation forming unit 11 forms the passage region R by simultaneously changing the orbital altitudes of all the satellites in orbital planes located adjacently, and maintains a state in which the average orbital altitudes of the plurality of orbital planes arranged in the azimuth direction are raised in a sequential order.

Specifically, the satellite constellation forming unit 11 generates an orbit control command to simultaneously change the orbital altitudes of all the satellites in orbital planes located adjacently and maintain a state in which the average orbital altitudes of the plurality of orbital planes arranged in the azimuth direction are raised in a sequential order. Then, the satellite constellation forming unit 11 transmits the orbit control command to the satellites 30 forming the satellite constellation. By performing orbit control in accordance with the orbit control command by each of the satellites forming the satellite constellation, the state in which the average orbital altitudes of the plurality of orbital planes arranged in the azimuth direction are raised in a sequential order is maintained, and the passage region R is formed.

By simultaneously changing the orbital altitudes of all the satellites in orbital planes located adjacently and maintaining the state in which the average orbital altitudes of the plurality of orbital planes arranged in the azimuth direction are raised in a sequential order, the relative angle in the azimuth direction is shifted individually for each of the orbital planes. This creates a region with a margin, that is, the passage region R among the orbital planes that have been located densely. By arranging that a large-scale space object passes through the passage region R in the process of an orbital descent in which the large-scale space object, after completing its mission, deorbits and enters the atmosphere, there is an effect that a risk of collision between the large-scale space object and the satellites constituting the satellite constellation can be reduced.

The formation of a passage region by the satellite constellation forming unit 11 will be described below using a specific example.

In this embodiment, it is assumed that the satellite constellation forming unit 11 forms a satellite constellation in which each orbital plane of a plurality of orbital planes passes through the polar regions and the polar regions are regions congested with the orbital planes. That is, it is the satellite constellation 20 described with reference to FIGS. 1 and 3. An example will be described here in which the satellite constellation forming unit 11 forms, as the passage region R, a region resulting from enlarging a space between orbital planes through which a space object is to pass among the plurality of orbital planes such that at least one relative angle in the azimuth direction between adjacent orbital planes is uneven.

Figure 10:
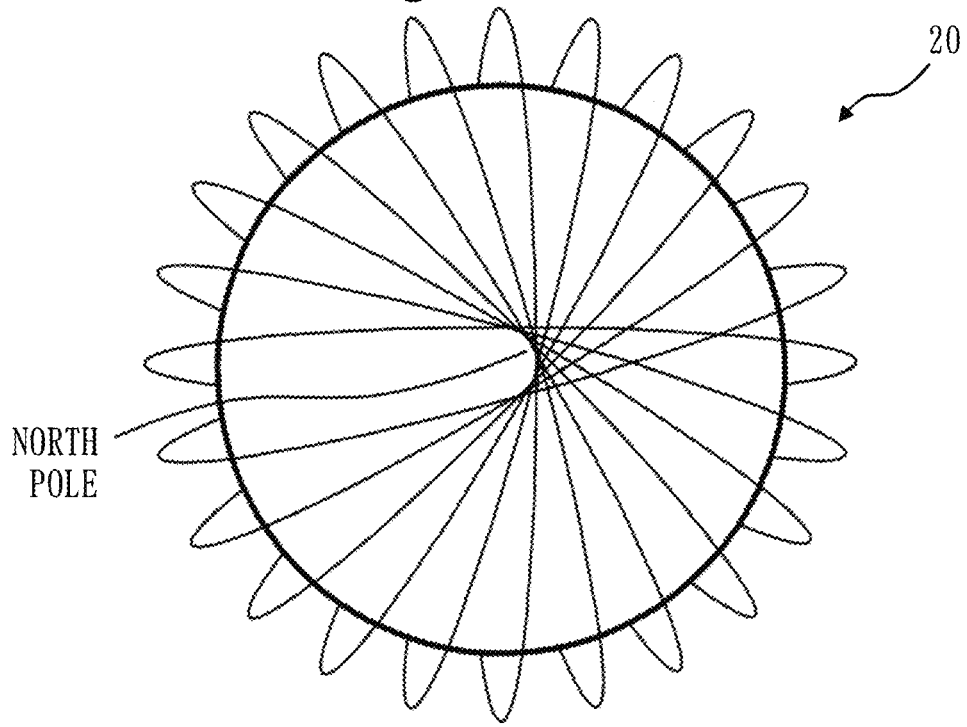
FIG. 10 is a diagram of 12 orbital planes of a satellite constellation composed of 24 orbital planes according to Embodiment 1 as seen from a direction of the North Pole.
Figure 11:
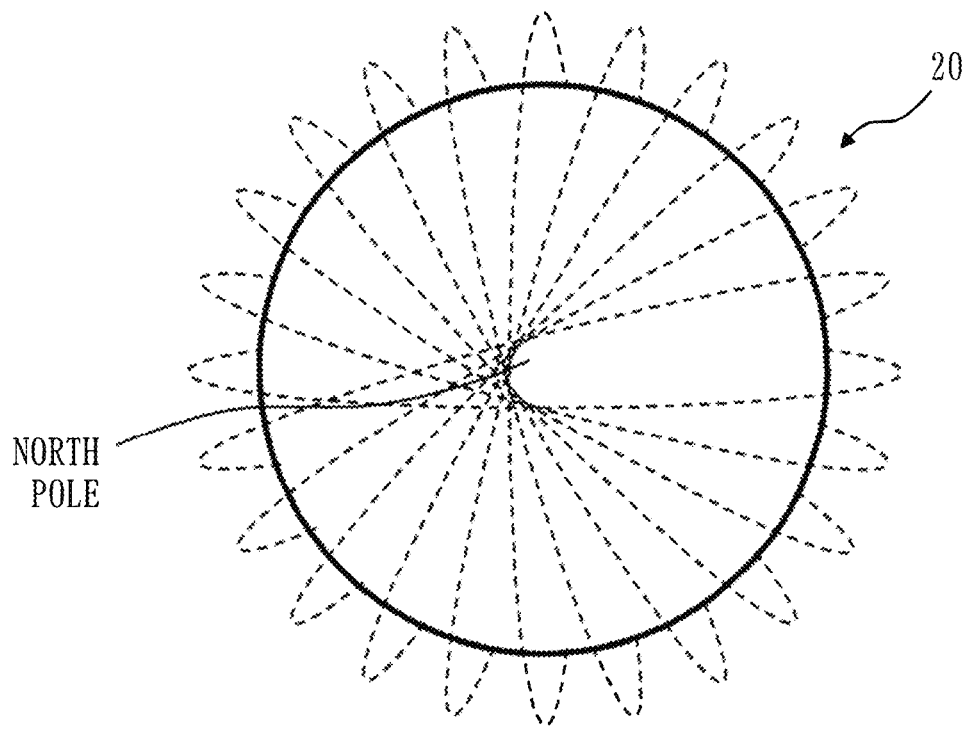
FIG. 11 is 12 orbital planes other than the 12 orbital planes of FIG. 10.
Figure 12:
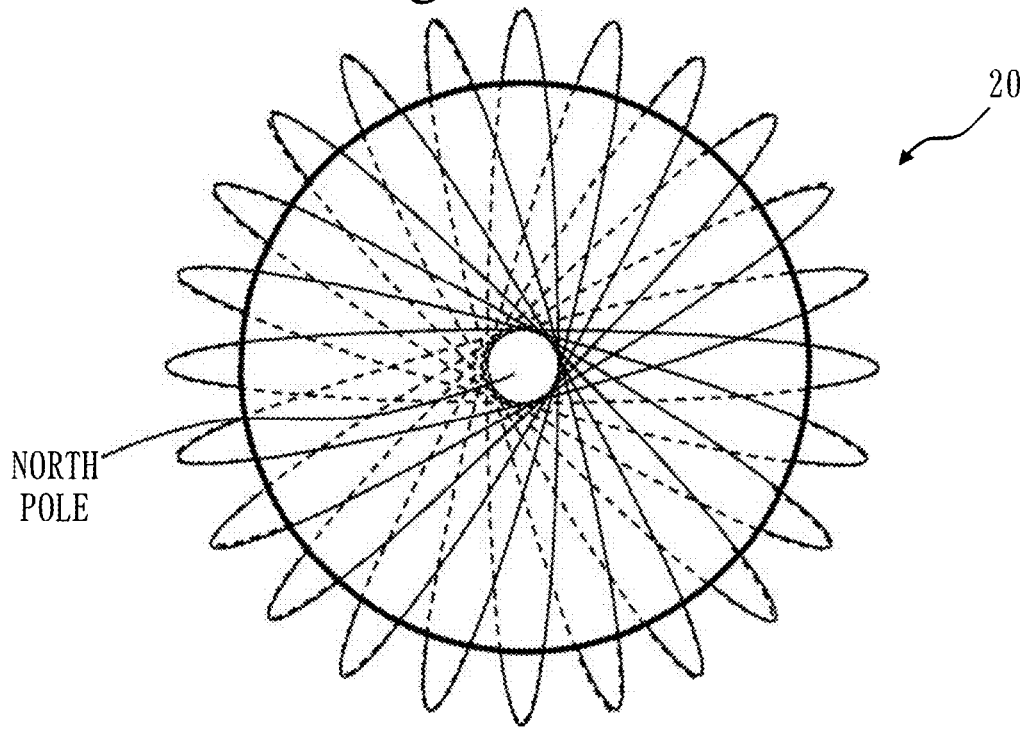
FIG. 12 is a total of 24 orbital planes resulting from combining the 12 orbital planes of FIG. 10 and the 12 orbital planes of FIG. 11.

FIGS. 10 to 12 are diagrams illustrating the satellite constellation 20 according to this embodiment.

FIGS. 10 to 12 illustrate an example of the satellite constellation 20 composed of polar orbit satellites with an orbital inclination of about 90 degrees. In the satellite constellation 20 of FIGS. 10 to 12, the congested region is in the vicinity of each of the polar regions.

FIG. 10 is a diagram of 12 orbital planes of the satellite constellation 20 composed of 24 orbital planes according to this embodiment as seen from a direction of the North Pole. FIG. 11 illustrates 12 orbital planes other than the 12 orbital planes of FIG. 10. FIG. 12 illustrates a total of 24 orbital planes resulting from combining the 12 orbital planes of FIG. 10 and the 12 orbital planes of FIG. 11.

The azimuth components of the normal lines of the orbital planes are separated each by 15 degrees. However, when seen from the North Pole, two orbital planes in which the azimuth components of the normal lines are directed to face each other appear to be overlapping. Therefore, it is necessary to note that it is easy to get an illusion that there are 12 orbital planes in FIG. 12.

Figure 13:
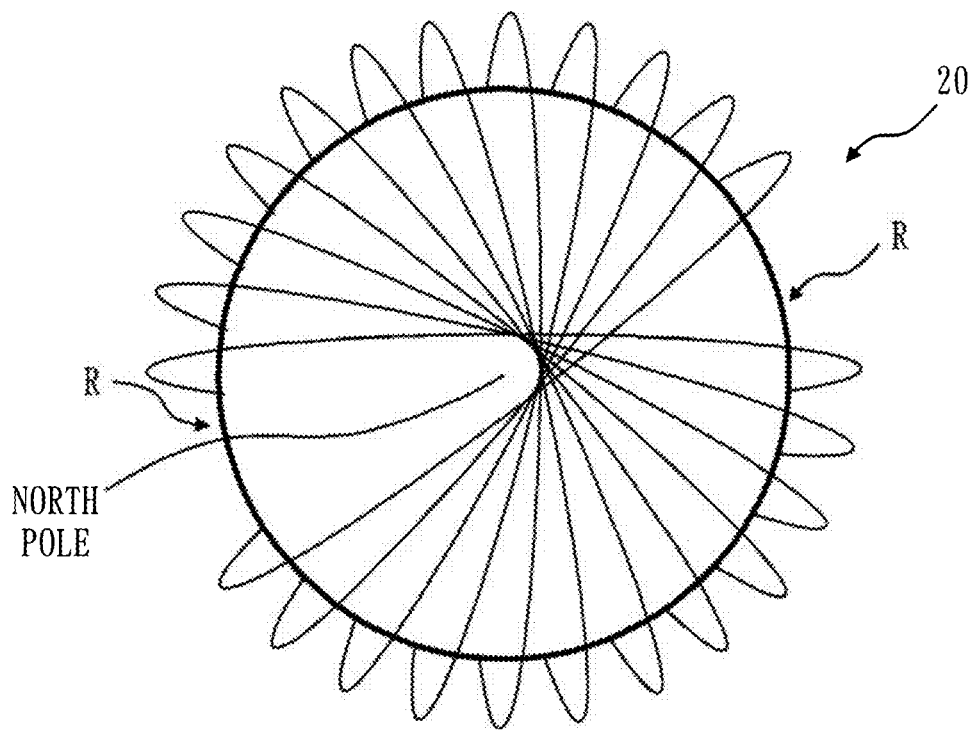
FIG. 13 is a diagram in which a passage region is formed in the satellite constellation of FIG. 10.
Figure 14:
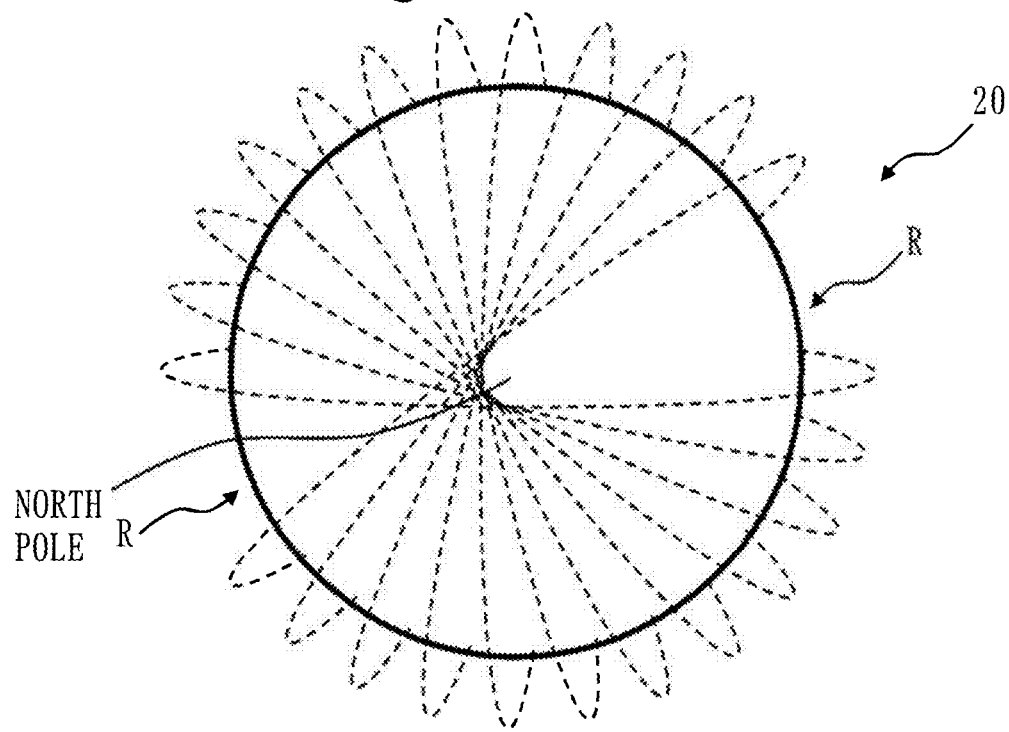
FIG. 14 is a diagram in which a passage region is formed in the satellite constellation of FIG. 11.
Figure 15:
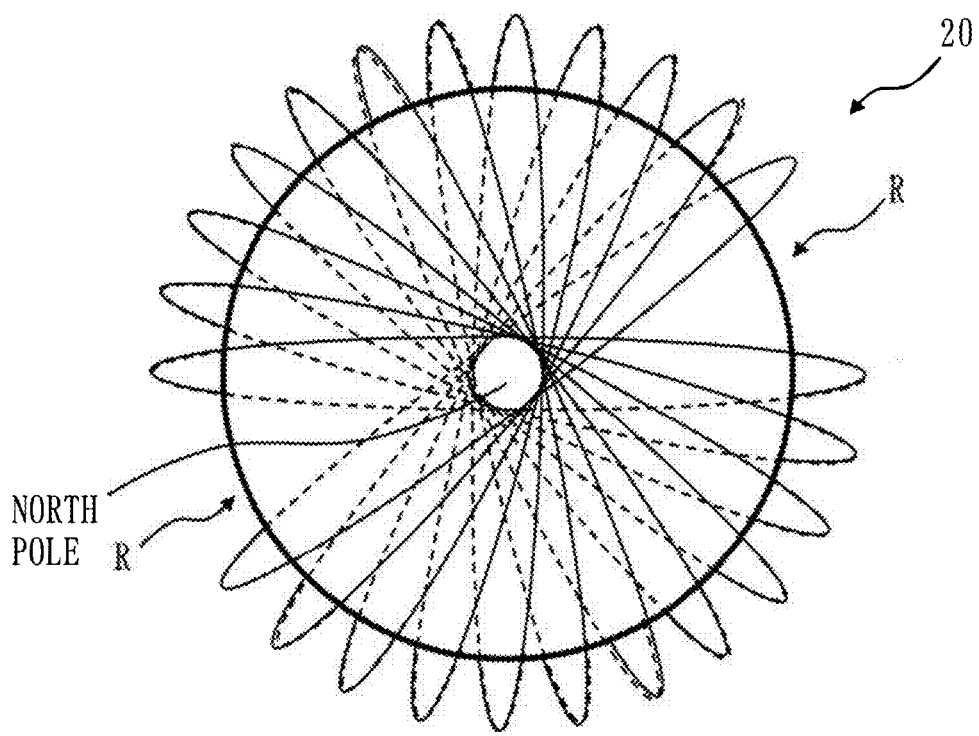
FIG. 15 is a diagram in which a passage region is formed in the satellite constellation of FIG. 12.

FIGS. 13 to 15 are diagrams illustrating the satellite constellation 20 in which the passage region R is formed according to this embodiment.

FIG. 13 is a diagram in which the passage region R is formed in the satellite constellation 20 of FIG. 10. FIG. 14 is a diagram in which the passage region R is formed in the satellite constellation 20 of FIG. 11. FIG. 15 is a diagram in which the passage region R is formed in the satellite constellation 20 of FIG. 12.

The satellite constellation forming unit 11 forms the passage region R by simultaneously changing the orbital altitudes of all the satellites in orbital planes located adjacently, and maintaining the state in which the average orbital altitudes of the plurality of orbital planes arranged in the azimuth direction are raised in a sequential order.

The orbital planes of FIGS. 13 and 14 are obtained by shifting the azimuth components of orbital planes located adjacently each by two degrees in the orbital planes of FIGS. 10 and 11. FIG. 15 illustrates the 24 orbital planes resulting from overlapping FIGS. 13 and 14. As a result, it can be seen that a gap, that is, the passage region R is generated between the orbital planes. As illustrated in FIG. 15, the passage region R is a region with a margin where no orbital plane is located or there are few orbital planes. If a large-scale space object passes through the passage region R like this, the large-scale space object can descend without a risk of colliding with the satellites forming the satellite constellation 20.

In step S103, the satellite constellation forming unit 11 determines whether the orbital planes spaced unevenly are to be moved.

If it is determined that the orbital planes spaced unevenly are to be moved, processing proceeds to step S104.

If it is not determined that the orbital planes spaced unevenly is to be moved, step S103 is repeated.

For example, when it is foreseen that after the space object has passed through the passage region formed in step S102 the space object will pass through a location other than the passage region, the satellite constellation forming unit 11 determines that the orbital planes spaced unevenly are to be moved.

In step S104, the satellite constellation forming unit 11 causes the satellite group to simultaneously ascend or descend in orbit so as to move the orbital plane spaced unevenly.

Specifically, the satellite constellation forming unit 11 generates an orbit control command to simultaneously change the orbital altitudes of all the satellites in orbital planes located adjacently and maintain the state in which the average orbital altitudes of the plurality of orbital planes arranged in the azimuth direction are lowered in a sequential order. Then, the satellite constellation forming unit 11 transmits the orbit control command to the satellites forming the satellite constellation. By performing orbit control in accordance with the orbit control command by each of the satellites forming the satellite constellation, the state in which the average orbital altitudes of the plurality of orbital planes arranged in the azimuth direction are lowered in a sequential order is maintained, and the satellite constellation 20 is restored to the state before the passage region R is formed.

Then, the satellite constellation forming unit 11 forms the satellite constellation 20 by substantially the same processing as that in step S102 so that the relative angle in the azimuth direction of adjacent orbital planes is uneven at a desired location in the satellite constellation 20.

Alternatively, the satellite constellation forming unit 11 may cause the satellite group to simultaneously ascend or descend in orbit so as to move the orbital planes spaced unevenly from the arrangement of the plurality of orbital planes formed in step S102 without restoring the arrangement of the plurality of orbital planes.

*Other Configurations* In this embodiment, the functions of the satellite constellation forming system 600 are realized by software. As a variation, the functions of the satellite constellation forming system 600 may be realized by hardware.

Figure 16:
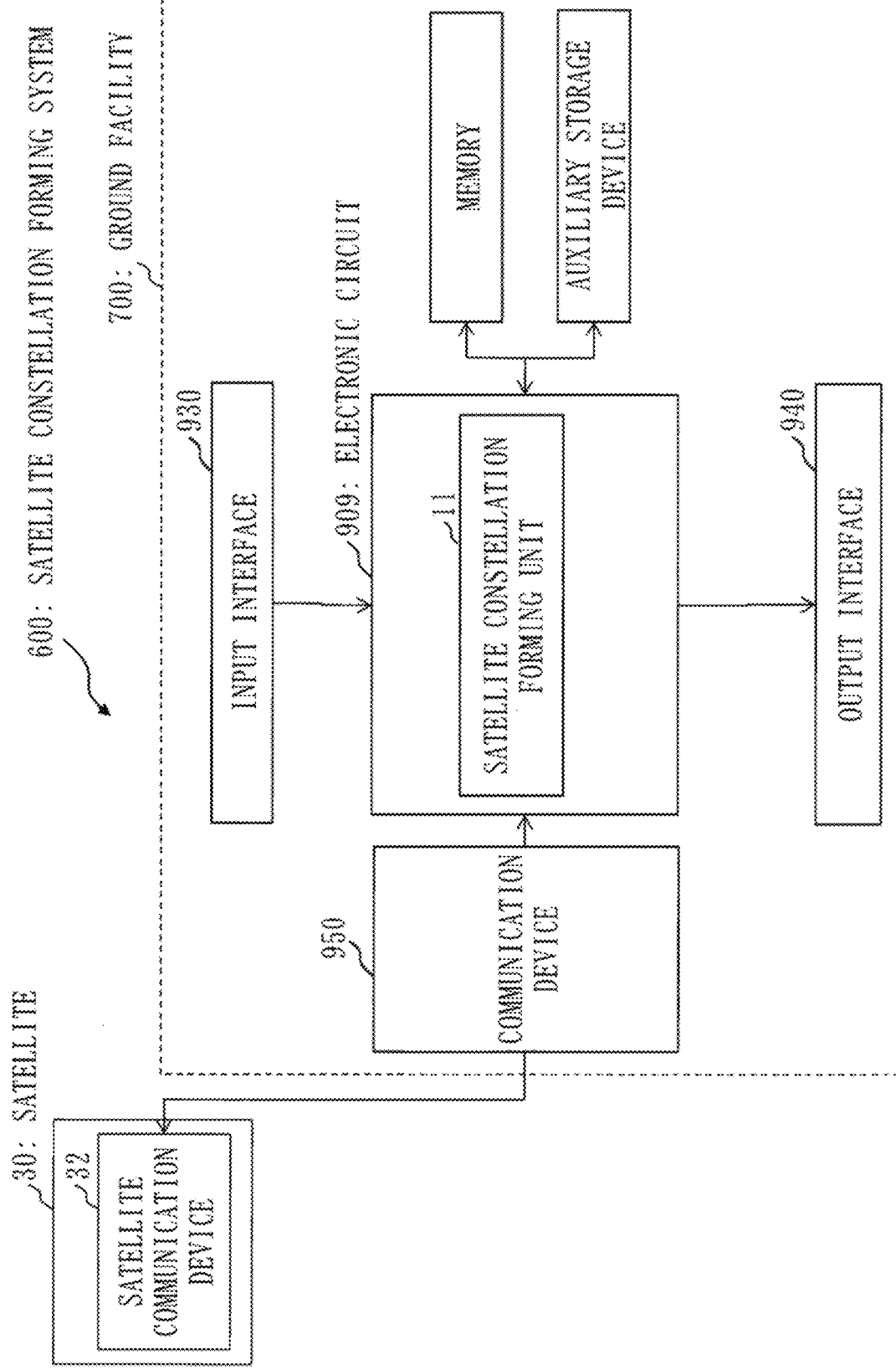
FIG. 16 is a configuration diagram of the satellite constellation forming system according to a variation of Embodiment 1.

FIG. 16 is a diagram illustrating a configuration of the satellite constellation forming system 600 according to a variation of this embodiment.

The satellite constellation forming system 600 includes an electronic circuit 909 in place of the processor 910.

The electronic circuit 909 is a dedicated electronic circuit that realizes the functions of the satellite constellation forming system 600.

Specifically, the electronic circuit 909 is a single circuit, a composite circuit, a programmed processor, a parallel-programmed processor, a logic IC, a GA, an ASIC, or an FPGA. GA is an abbreviation for Gate Array.

The functions of the satellite constellation forming system 600 may be realized by one electronic circuit, or may be distributed among and realized by a plurality of electronic circuits.

As another variation, some of the functions of the satellite constellation forming system 600 may be realized by the electronic circuit, and the rest of the functions may be realized by software.

Each of the processor and the electronic circuit is also called processing circuitry. That is, the functions of the satellite constellation forming system 600 are realized by the processing circuitry.

Description of Effects of this Embodiment

In the satellite constellation forming system according to this embodiment, a spatial vacant region for a deorbiting space object when it descends though the orbital altitude of a satellite constellation can be secured by spacing orbital planes unevenly. Therefore, the satellite constellation forming system according to this embodiment can eliminate a risk of collision.

In the satellite constellation forming system according to this embodiment, the satellite-ground communication means of satellites flying in orbital planes spaced unevenly have a communication range that completely covers the ground above the equator. Therefore, with the satellite constellation forming system according to this embodiment, no gap is generated in a ground service, so that the service range of a mounted mission is set to be adaptable to uneven spacing.

In the satellite constellation forming system according to this embodiment, when a space object that is going to descend in orbit from a higher altitude does not have autonomous control capability and it is predicted in orbit analytical prediction that the space object will pass through the outside of a vacant region of orbital planes spaced unevenly, the mega-constellation business operator can change the location of uneven spacing in advance. Therefore, with the satellite constellation forming system according to this embodiment, there is an effect that a collision can be avoided by letting a space object pass through the vacant region. By synchronizing all satellites, that is, causing the satellite group to simultaneously ascend or descend in orbit, there is an effect that a communication service can be continued without interrupting the service.

Embodiment 2

In this embodiment, differences from Embodiment 1 or additions to Embodiment 1 will be mainly described. In this embodiment, components that are substantially the same as those in Embodiment 1 will be denoted by the same reference signs and description thereof will be omitted.

The configurations of the satellite constellation forming system 600, the satellite 30, and the ground facility 700 according to this embodiment are substantially the same as those in Embodiment 1.

In this embodiment, it is assumed that the satellite constellation forming unit 11 forms a satellite constellation in which each orbital plane of a plurality of orbital planes does not pass through the polar regions and a mid-latitude region is a region congested with the orbital planes. That is, it is the satellite constellation 20 described with reference to FIG. 4. Specifically, the mid-latitude region is each of the vicinity of a latitude of 50 degrees north and the vicinity of a latitude of 50 degrees south. The satellite constellation forming unit 11 forms a region in which the density of orbital planes is alleviated as the passage region R.

In this embodiment, the passage region R is a vacant region in which the density is alleviated by spacing adjacent orbital planes unevenly.

Figure 17:
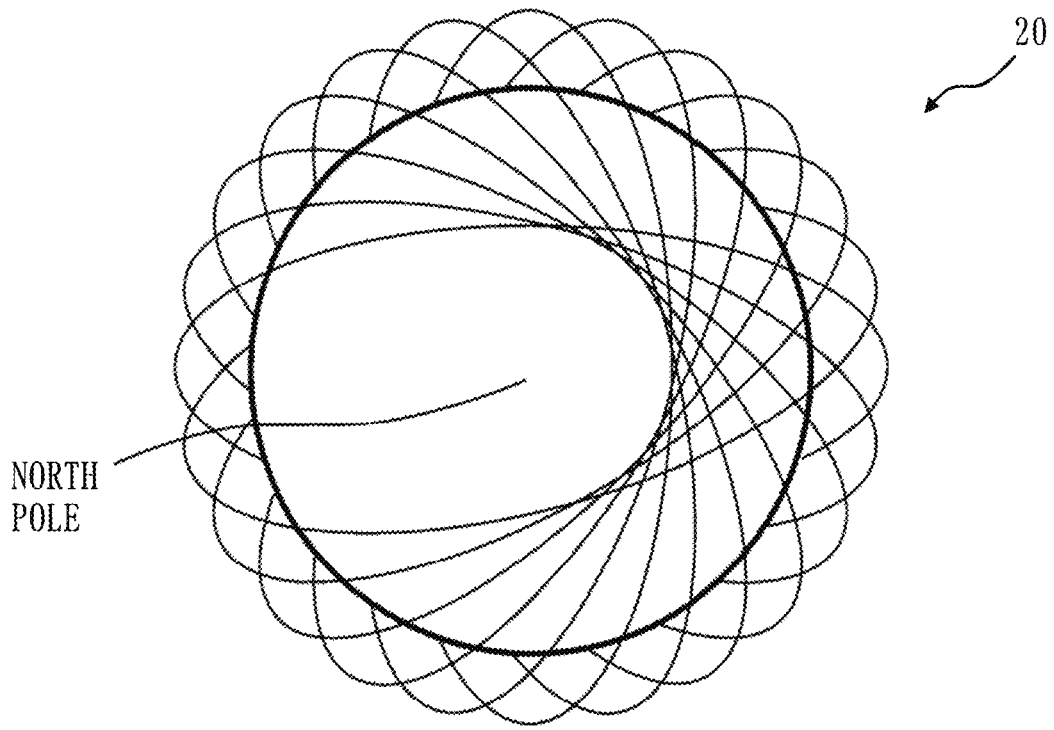
FIG. 17 is a diagram of 12 orbital planes of a satellite constellation composed of 24 orbital planes according to Embodiment 2 as seen from a direction of the North Pole.
Figure 18:
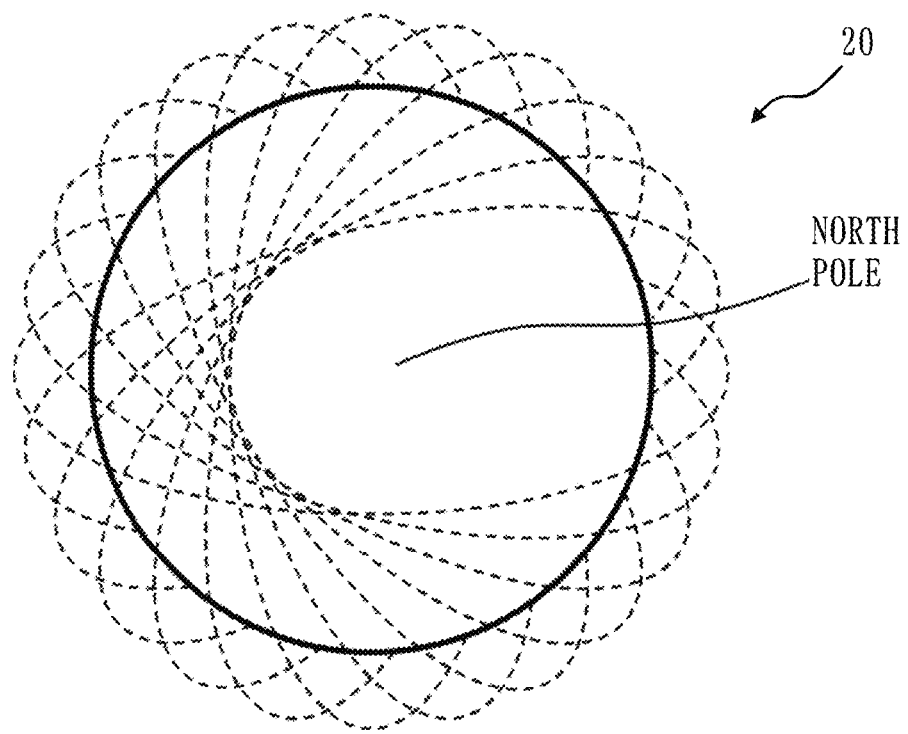
FIG. 18 is 12 orbital planes other than the 12 orbital planes of FIG. 17.
Figure 19:
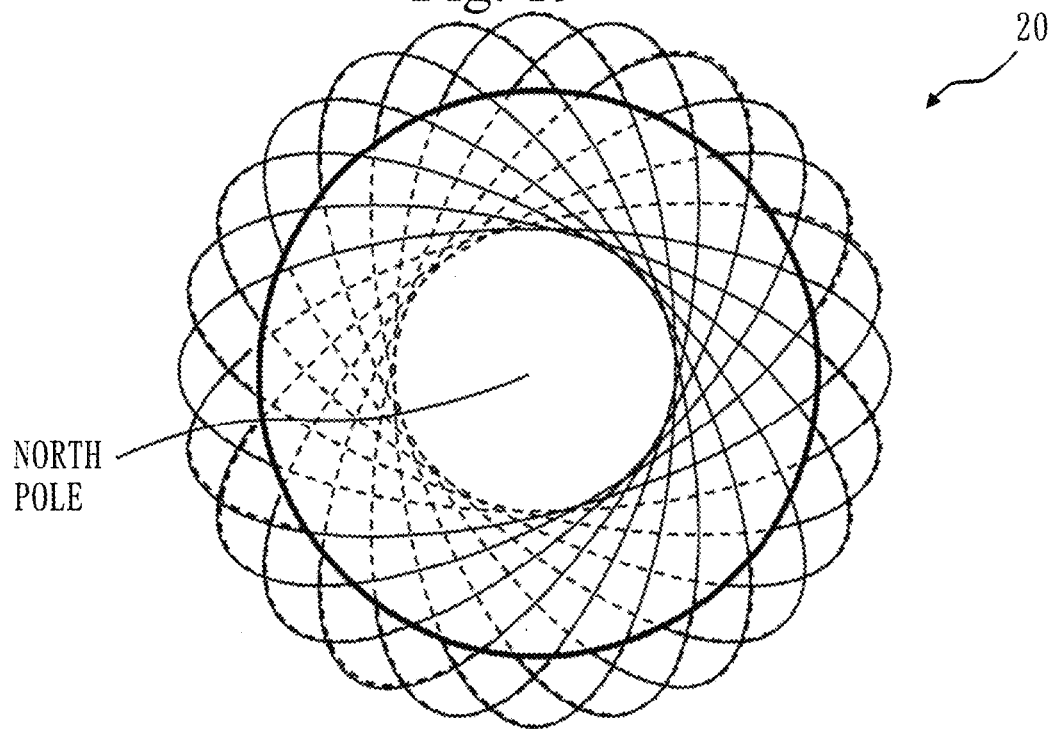
FIG. 19 is a total of 24 orbital planes resulting from combining the 12 orbital planes of FIG. 17 and the 12 orbital planes of FIG. 18.

FIG. 17 is a diagram of 12 orbital planes of the satellite constellation 20 composed of 24 orbital planes according to this embodiment as seen from the direction of the North Pole. FIG. 18 illustrates 12 orbital planes other than the 12 orbital planes of FIG. 17. FIG. 19 illustrates a total of 24 orbital planes resulting from combining the 12 orbital planes of FIG. 17 and the 12 orbital planes of FIG. 18.

FIGS. 17 to 19 illustrate an example of the satellite constellation 20 composed of satellites in orbit with an orbital inclination away from 90 degrees. In the satellite constellation 20 of FIGS. 17 to 19, the congested region is in the vicinity of the mid-latitude region.

Each of FIGS. 17 and 18 illustrates 12 orbital planes as seen from the North Pole, as in the case of FIGS. 10 and 11. FIG. 19 illustrates 24 orbital planes resulting from combining the 12 orbital planes of each of FIG. 17 and FIG. 18. In FIG. 12 of Embodiment 1, there is a region congested with all the orbital planes in the polar region. In FIG. 19 of this embodiment, the latitude of the congested region, which has been in the polar region, is lowered to mid-latitude, and the degree of congestion is also alleviated. On the other hand, intersection points between orbital planes exist in a grid pattern over the entire mid-latitude region.

In a mega-constellation, several tens of satellites are flying in each orbital plane. Therefore, an overlap or an intersection point of orbital planes indicates a possibility of collision. Accordingly, an area with a high degree of congestion indicates a high probability of collision.

Figure 20:
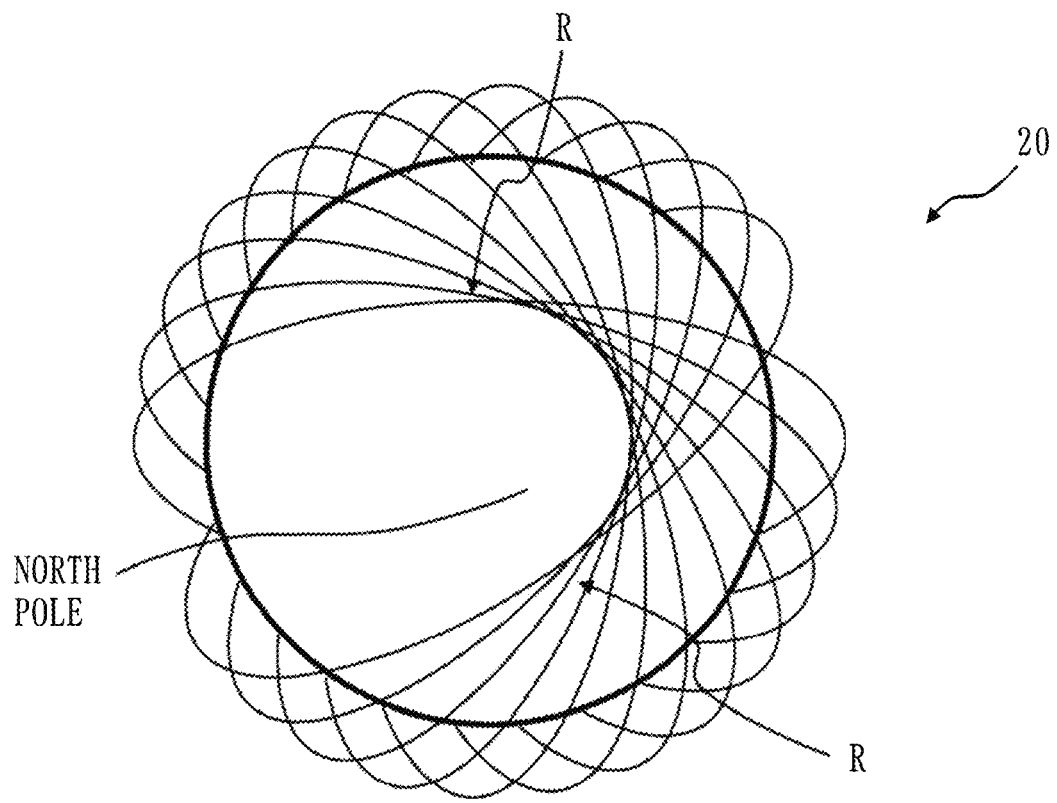
FIG. 20 is a diagram in which orbital planes spaced unevenly are formed in the satellite constellation of FIG. 17.
Figure 21:
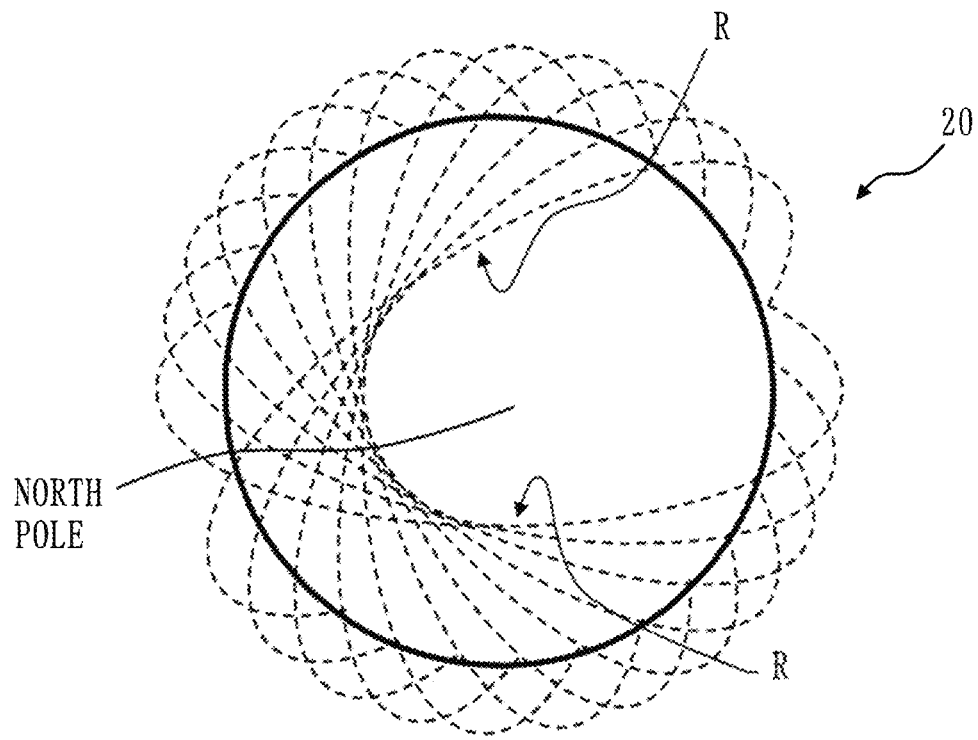
FIG. 21 is a diagram in which orbital planes spaced unevenly are formed in the satellite constellation of FIG. 18.
Figure 22:
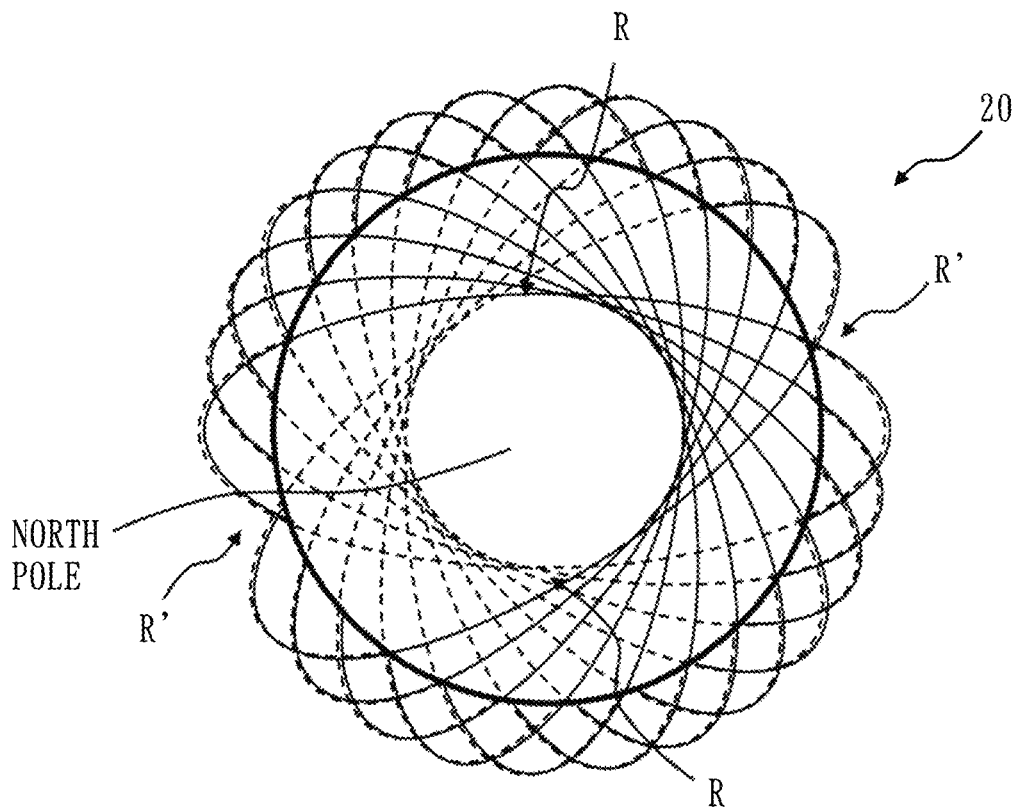
FIG. 22 is a diagram in which orbital planes spaced unevenly are formed in the satellite constellation of FIG. 19.

FIG. 20 is a diagram in which orbital planes spaced unevenly are formed in the satellite constellation 20 of FIG. 17. FIG. 21 is a diagram in which orbital planes spaced unevenly are formed in the satellite constellation 20 of FIG. 18. FIG. 22 is a diagram in which orbital planes spaced unevenly are formed in the satellite constellation 20 of FIG. 19.

The satellite constellation forming unit 11 forms the orbital planes spaced unevenly by simultaneously changing the orbital altitudes of all the satellites in orbital planes located adjacently and maintaining the state in which the average orbital altitudes of the plurality of orbital planes arranged in the azimuth direction are raised in a sequential order. A region R' where adjacent orbital planes are spaced unevenly is formed. The passage region R here is a region in which the degree of congestion of overlaps or intersection points of orbital planes is alleviated. The region R' where adjacent orbital planes are spaced unevenly is a vacant region where adjacent orbital planes are spaced unevenly.

By shifting the azimuth components of orbital planes located adjacently each by two degrees in the orbital planes of FIGS. 17 and 18, the orbital planes of FIGS. 20 and 21 are obtained. FIG. 22 illustrates the 24 orbital planes resulting from overlapping the orbital planes of FIG. 20 and the orbital planes of FIG. 21. As a result, it can be seen that a region with a margin where the degree of congestion of overlaps or intersection points of orbital planes is alleviated, that is, the passage region R is generated in the mid-latitude region. The orbital inclination of the ISS is away from 90 degrees and is close to the orbital inclination of the mega-constellation planned to be built at an orbital altitude of 340 km. Therefore, this passage region R is more effective for a descent of the ISS. As illustrated in FIG. 22, unlike polar orbit satellites, there are intersection points of orbital planes with the azimuth components of the normal lines facing each other in the mid-latitude zone in the passage region R. However, when FIG. 19 and FIG. 22 are compared, it can be seen that a risk of collision is reduced by forming the passage region R.

Also in this embodiment, after the space object has passed through the passage region R, the satellite constellation forming unit 11 restores the satellite constellation 20 to the state before the passage region R is formed. The satellite constellation 20 is restored from the state of FIGS. 20 to 22 in which the passage region R is formed to the state of FIGS. 17 to 19 in which the passage region R is not formed.

A specific example in which the ISS deorbits and makes an orbital descent will now be described.

The ISS is flying with an orbital inclination of about 50 degrees and at an orbital altitude of about 400 km. In the process of deorbiting and making an orbital descent, the ISS descends in orbital altitude while roughly maintaining an orbital inclination of about 50 degrees. In deorbiting and making an orbital descent, the ISS needs to change the orbital altitude without colliding with a mega-constellation planned to be built as follows:
about 2500 satellites with an orbital inclination of about 53 degrees and at an orbital altitude of about 346 km,
about 2500 satellites with an orbital inclination of about 48 degrees and at an orbital altitude of about 341 km, and
about 2500 satellites with an orbital inclination of about 42 degrees and at an orbital altitude of about 336 km.

Figure 23:
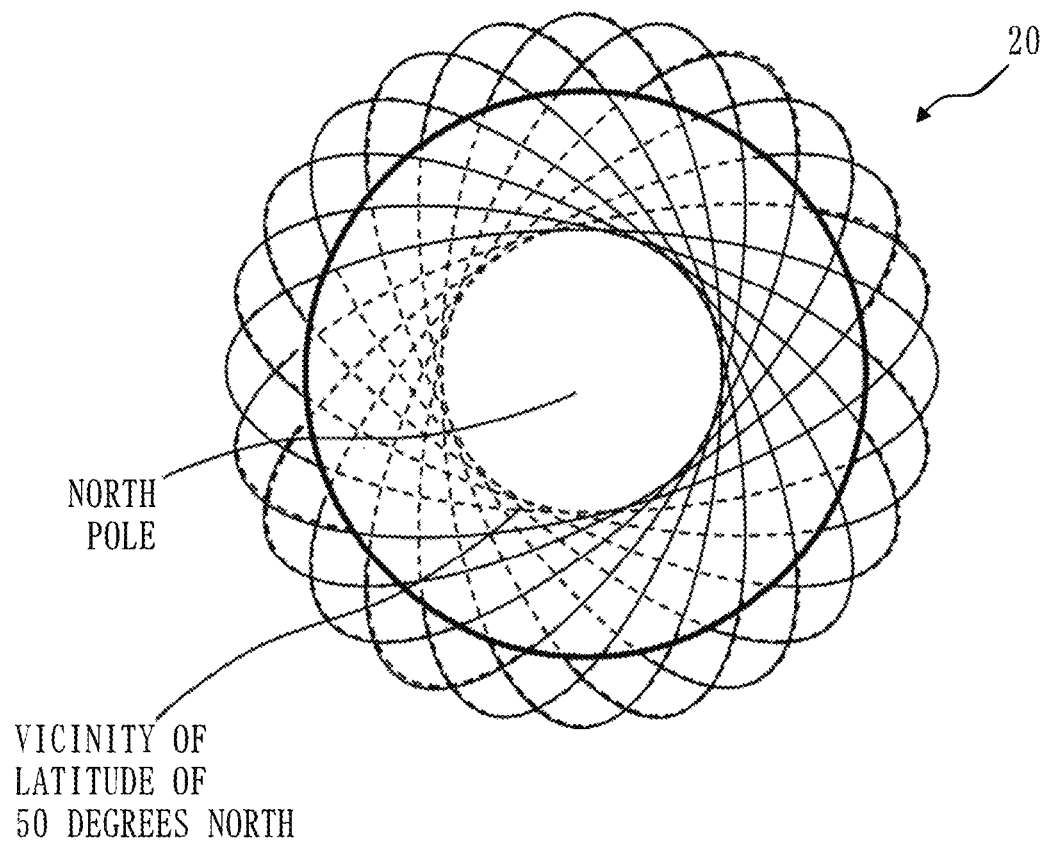
FIG. 23 is a diagram of a mega-constellation according to Embodiment 2 as seen from the North Pole.

FIG. 23 is a diagram of the mega-constellation according to this embodiment as seen from the North Pole.

As indicated in FIG. 23, the northernmost ends and southernmost ends of all the orbital planes are located in the vicinity of a latitude of about 50 degrees north and the vicinity of a latitude of about 50 degrees south, respectively. Therefore, in the vicinity of a latitude of about 50 degrees north and the vicinity of a latitude of about 50 degrees south, the residence time for satellites to fly in an east-west direction is long, and intersection points of orbital planes exist densely. The vicinity of a latitude of about 50 degrees north and the vicinity of a latitude of about 50 degrees south are dangerous zones with an extremely high risk of collision.

Figure 24:
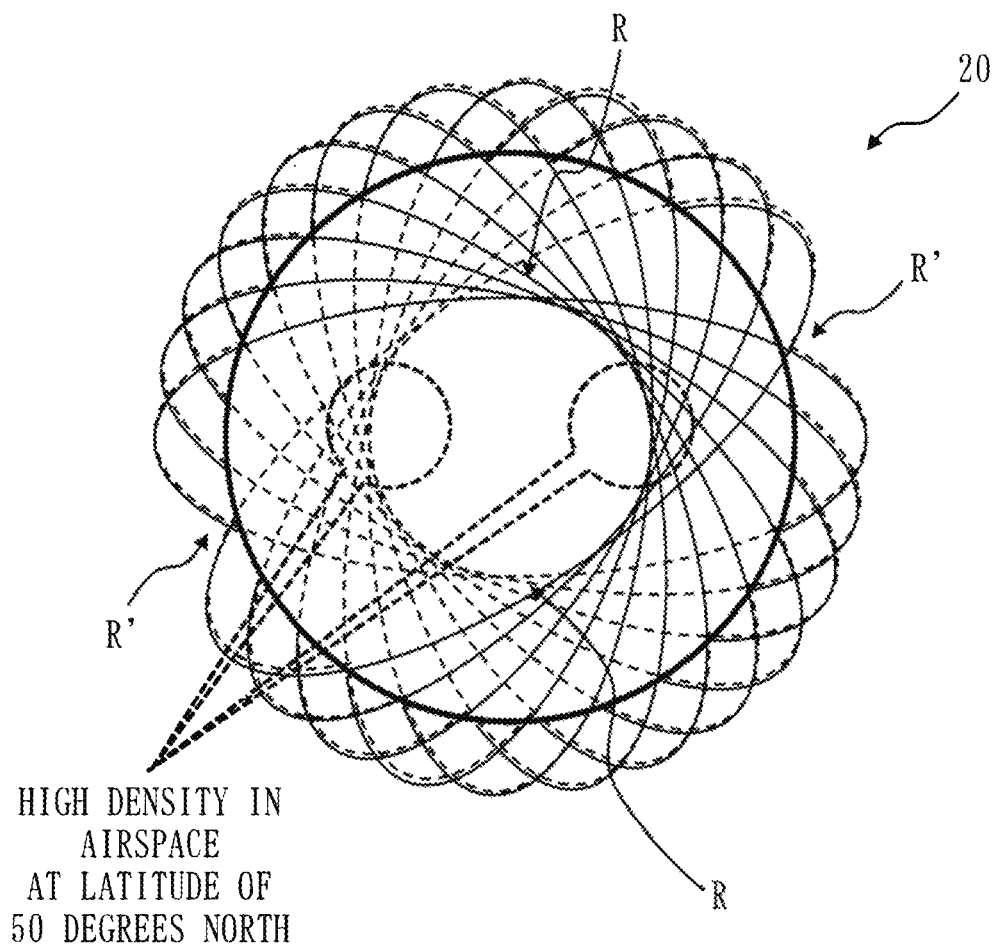
FIG. 24 is a diagram of a mega-constellation in which a passage region is formed according to Embodiment 2 as seen from the North Pole.

FIG. 24 is a diagram of the mega-constellation in which the passage region R is formed according to this embodiment as seen from the North Pole.

As illustrated in FIG. 24, the satellite constellation forming system 600 according to this embodiment generates a region where the density of intersection points of orbital planes is high and a region where the density of intersection points of orbital planes is alleviated, that is, the passage region R at a latitude of about 50 degrees north. This has the effect of alleviating the density of the high-density dangerous zones of the northernmost and southernmost ends of the orbital planes, so that this non-dense region is used as the passage region R for a large-scale space object so as to avoid a collision. The orbit of a large-scale space object, such as the ISS, can be grasped in advance, so that the mega-constellation may shift the orbital planes according to the angle in the azimuth direction of the orbital planes in a time period when the orbital altitude is in the vicinity of 340 km.

Figure 25:
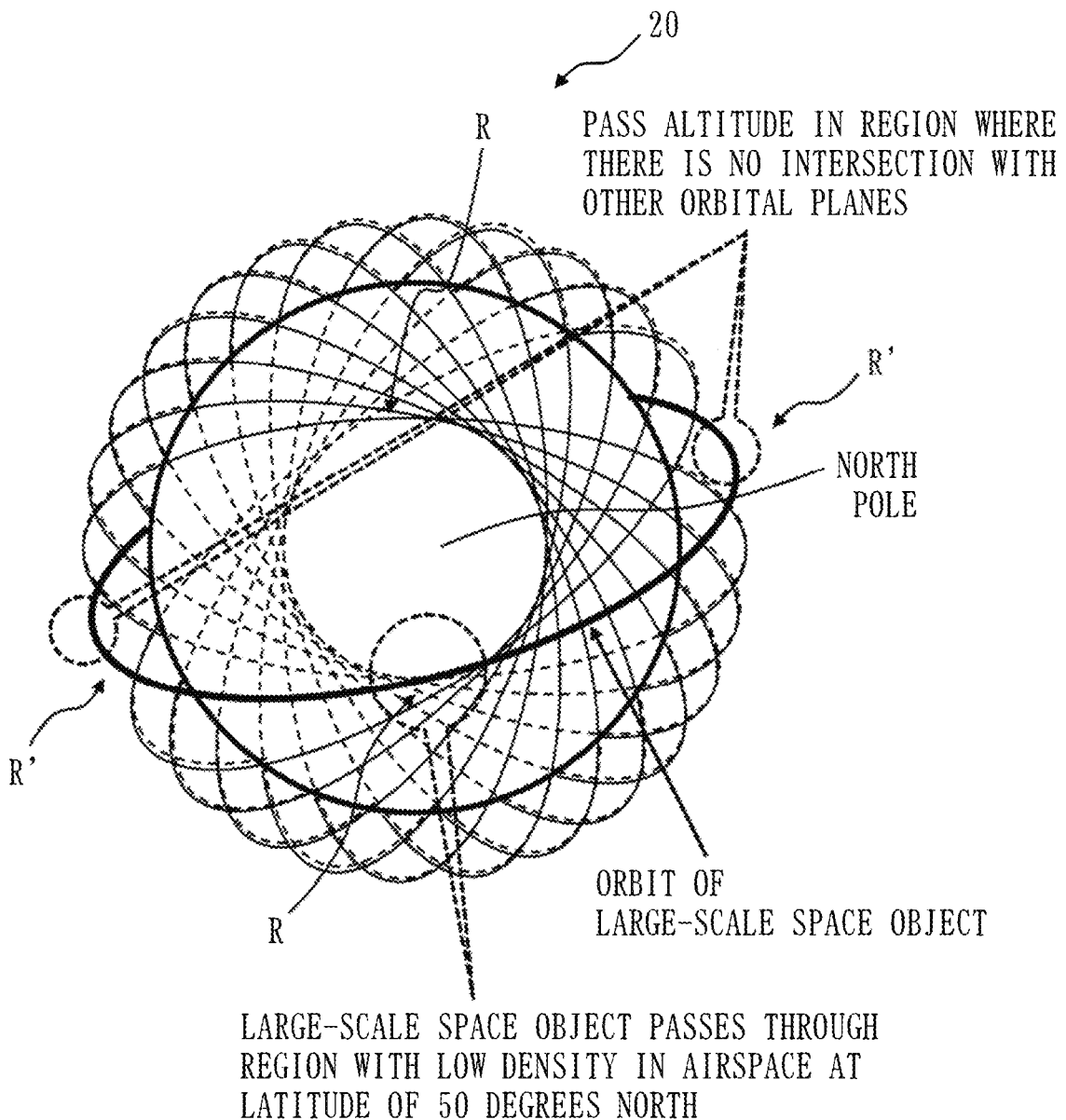
FIG. 25 is an example of avoidance of a collision between the mega-constellation in which the passage region is formed according to Embodiment 2 and a large-scale space object.

FIG. 25 is a diagram illustrating an example of avoidance of a collision between the mega-constellation in which the passage region R is formed according to this embodiment and a large-scale space object.

Although the high density is alleviated, the vicinity of each of the northernmost end and the southernmost end of each of the orbital planes is still a dangerous zone where intersection points with other orbital planes exist densely. Therefore, it is desirable that the passage through the dangerous altitude zone is performed through a region R' which is above the equator and in which there is no intersection point of orbital planes and adjacent orbital planes are spaced unevenly. When a propulsion device to be used for deorbit has very large thrust, it is effective for the large-scale space object to decelerate rapidly above the equator and pass through the dangerous altitude zone in a short time.

When it is not possible to provide a propulsion device with such high thrust, a realistic collision avoidance measure is to shift the time period in which the large-scale space object passes by the satellites so as to avoid a collision in the region where there are intersection points of orbital planes.

Since the vicinity of each of the northernmost end and the southernmost end of the orbital planes is the dangerous zone, it is effective to pass through dangerous altitude zones, which are, for example, altitude zones of an orbital altitude of about 346 km, an orbital altitude of about 341 km, and an orbital altitude of about 336 km, within a period from passage through the polar region to next passage through the polar region.

The term "altitude zone" is used because the orbital altitude of the satellite group composed of about 2500 satellites at each altitude varies or fluctuates.

When the ISS is made to descend in orbit, it is possible for the ISS to select the descent timing and control the descent timing and descent velocity. Therefore, it is effective that the ISS selects and passes through a vacant region of orbital planes that have been spaced unevenly by the mega-constellation in advance.

Similarly, in the descent of a satellite or a debris removal satellite with active deorbit operation capability in a deorbit operation process, the space object that is to descend in orbit selects a vacant region and descends in orbit.

A method for realizing a communication service between satellites and the ground will now be presented as feasibility of a communication mission.

Figure 26:
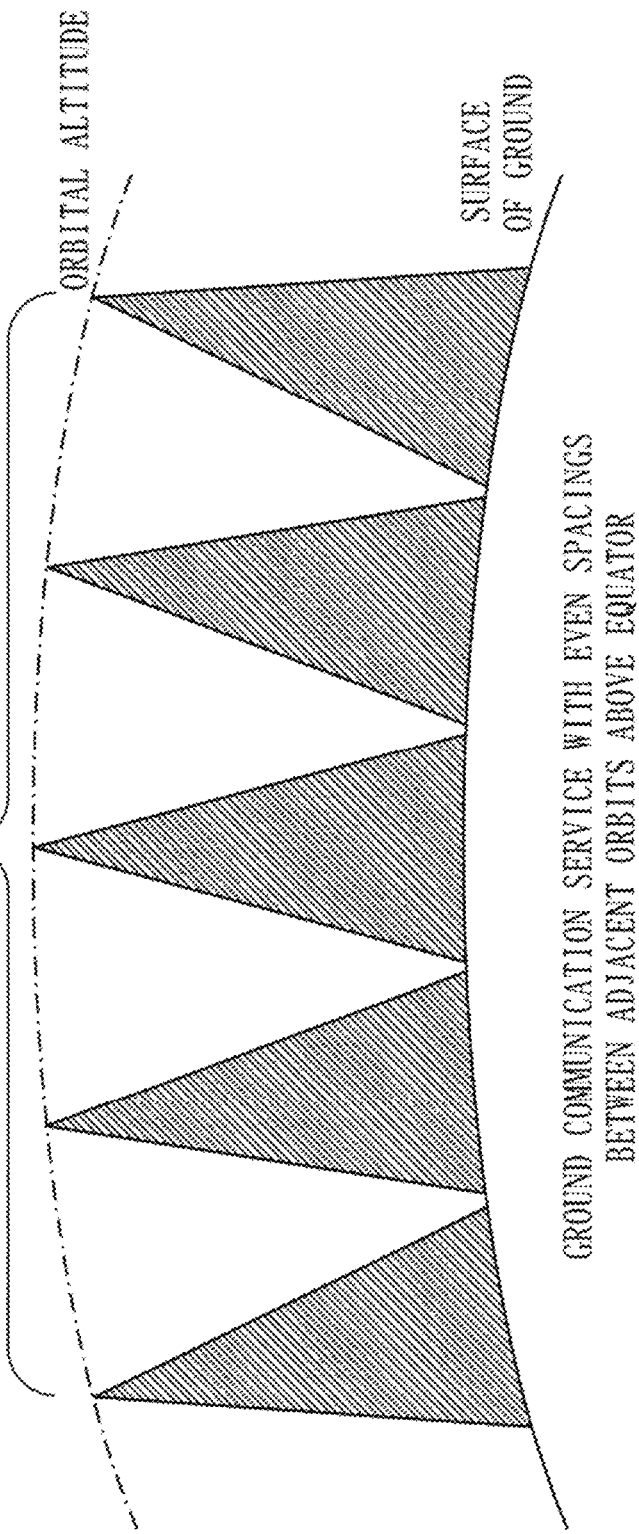
FIG. 26 is an example of realizing a ground communication service from satellites in a state in which adjacent orbits are spaced evenly.

FIG. 26 is a diagram illustrating an example of realizing a ground communication service from satellites in a state in which spacings between adjacent orbits are even.

Figure 27:
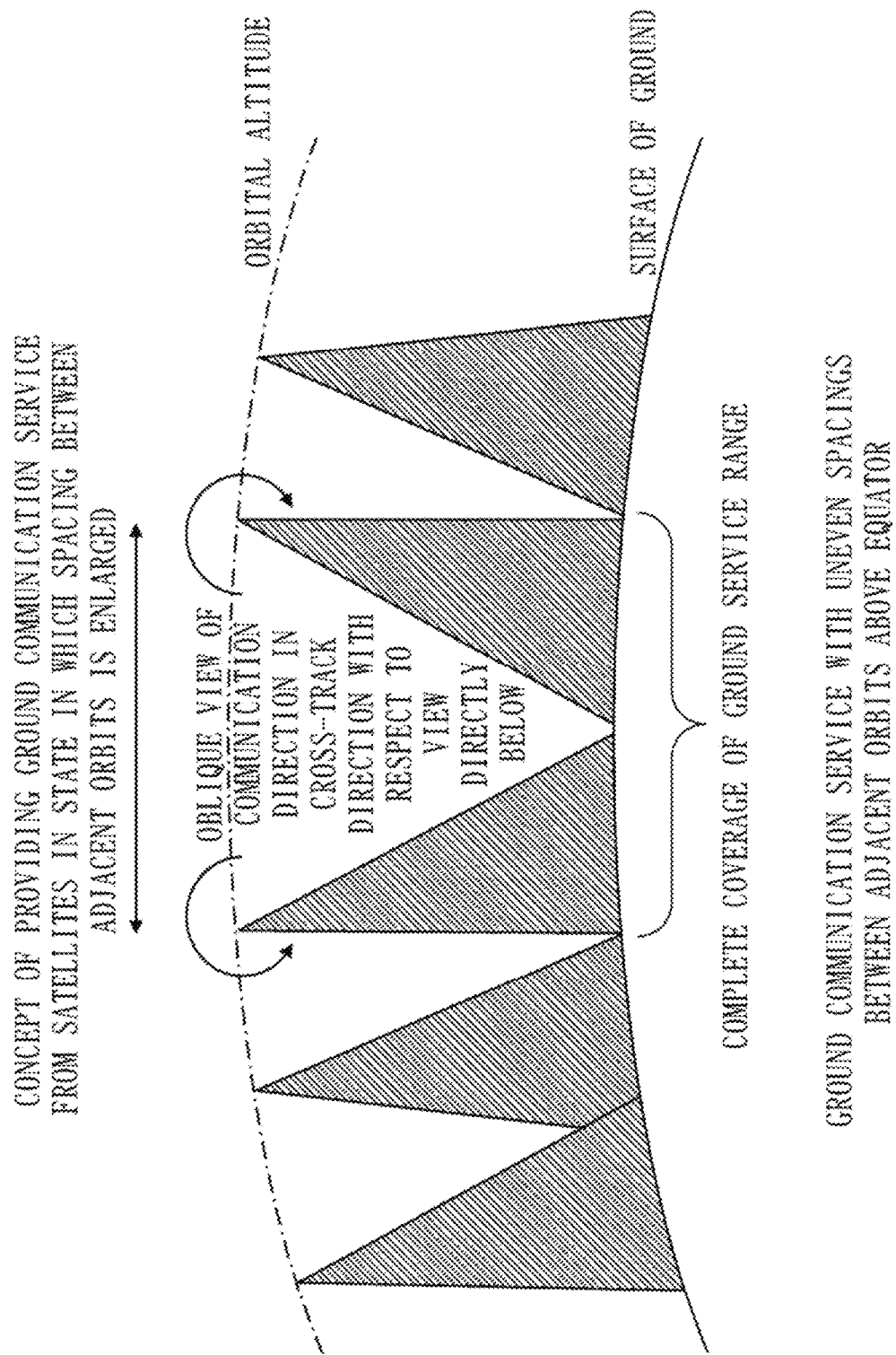
FIG. 27 is an example of realizing a ground communication service from satellites in a state in which adjacent orbits are spaced unevenly.

FIG. 27 is a diagram illustrating an example of realizing a ground communication service from satellites in a state in which spacings between adjacent orbits are uneven.

FIG. 26 indicates an image of a communication service between satellites and the ground when orbital planes are spaced evenly. The widest spacing between adjacent orbits is above the equator. Therefore, if the ground service at the equator is completely covered, the complete coverage of the communication service can be secured.

FIG. 27 illustrates an image of a communication service between satellites and the ground when spacings between adjacent orbital planes are arranged to be uneven so as to enlarge a spacing between adjacent orbits. FIG. 27 indicates an example in which the direction of the communication mission is rotated in a cross-track direction in advance in order to secure the complete coverage of the ground communication service.

As another method, it is also effective to set a wide communication service range with a margin in advance.

Figure 28:
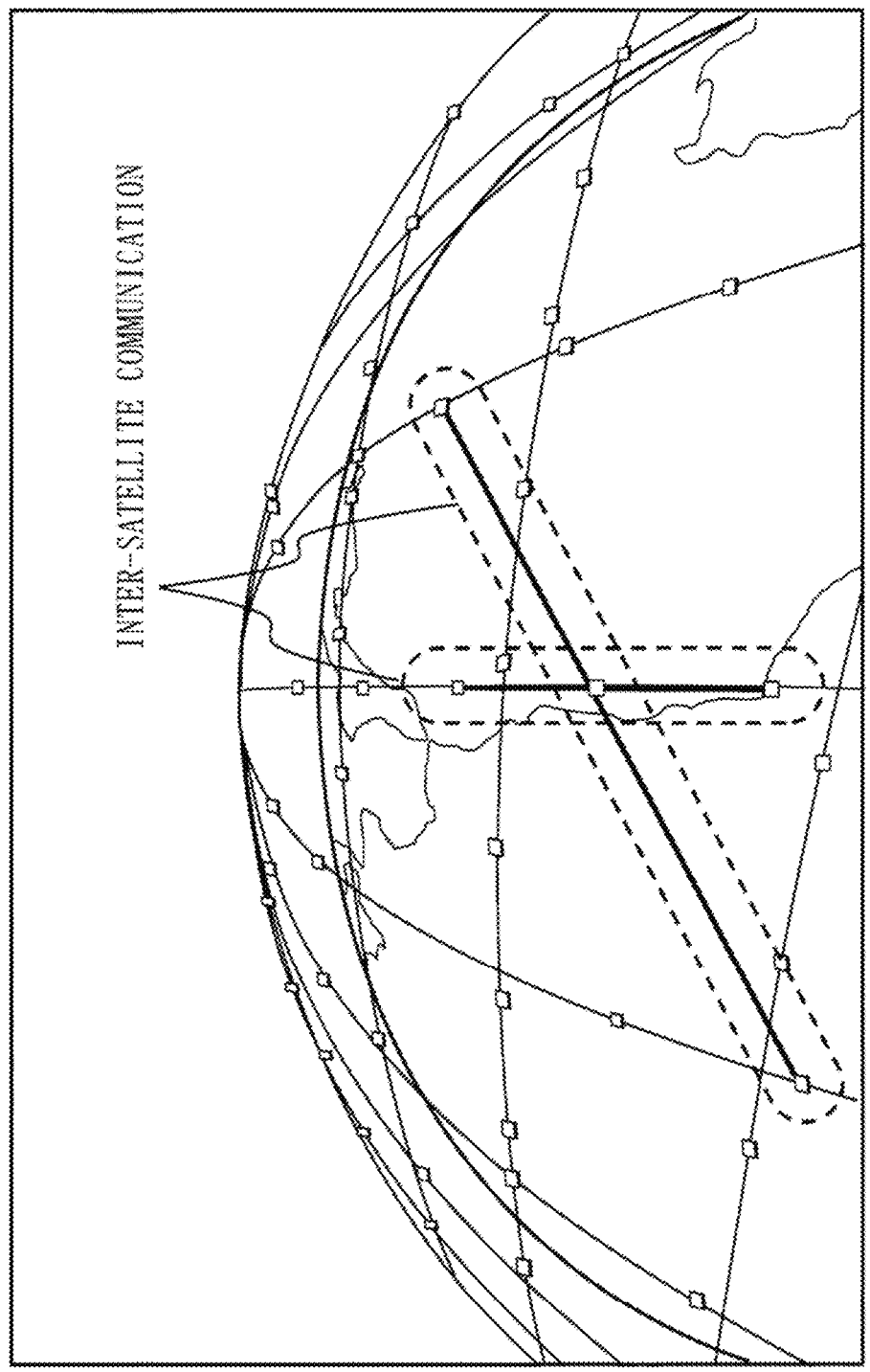
FIG. 28 is an example of a concept of an inter-satellite communication mission by a mega-constellation business operator, that is, a conceptual diagram of inter-satellite communication.

FIG. 28 is an example of a concept of an inter-satellite communication mission by a mega-constellation business operator, that is, a conceptual diagram of inter-satellite communication.

Figure 29:
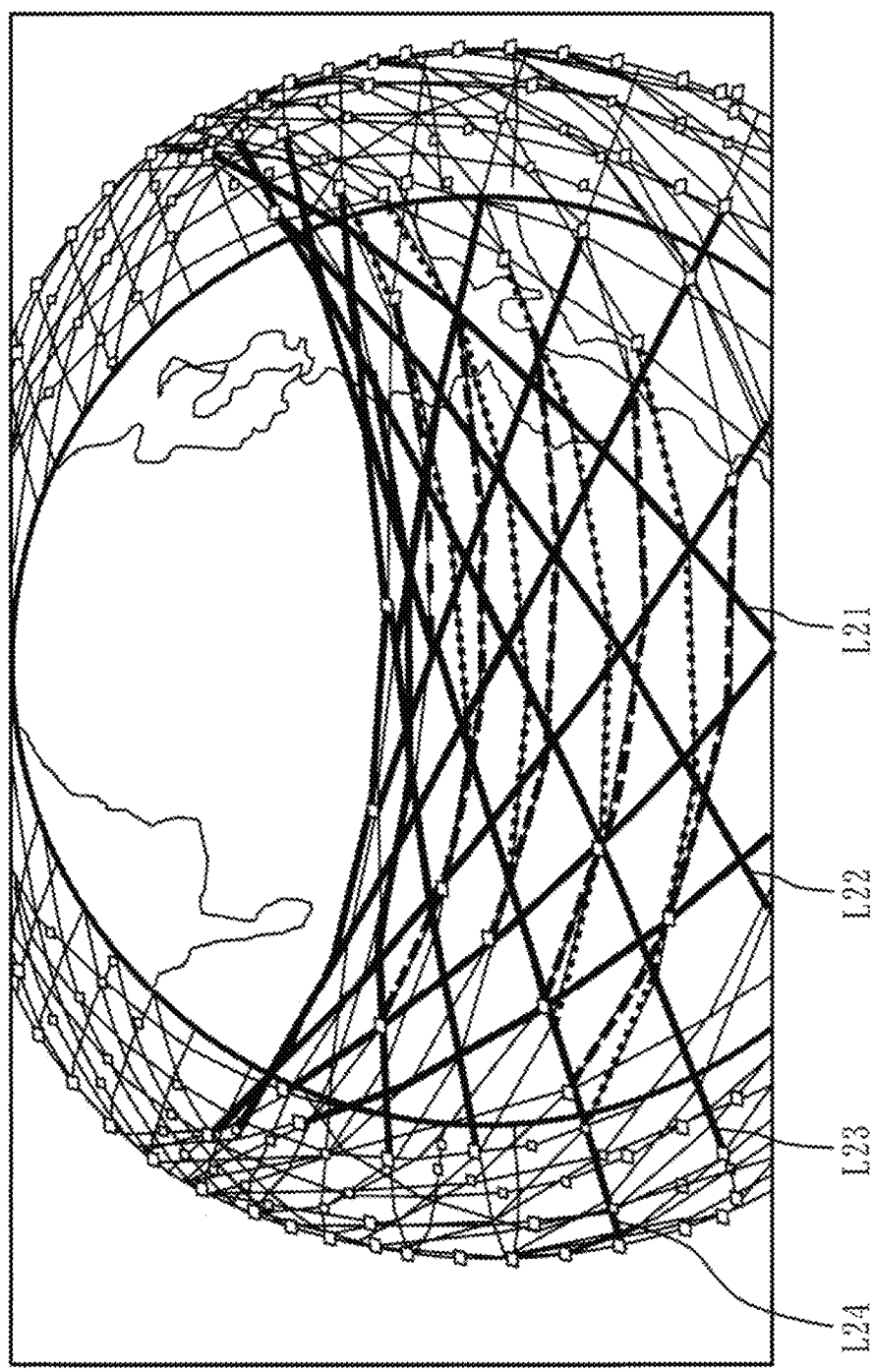
FIG. 29 is a diagram illustrating an image of an inter-satellite communication network in which orbital planes are spaced evenly by a mega-constellation business operator.

FIG. 29 is a diagram illustrating an image of an inter-satellite communication network by a mega-constellation business operator when orbital planes are spaced evenly.

According to the concept of inter-satellite communication by the mega-constellation business operator of FIG. 28, inter-satellite communication is performed not only with satellites flying in preceding and succeeding positions in the same orbital plane but also with satellites flying in diagonally preceding and succeeding positions in adjacent orbital planes. Therefore, the inter-satellite communication network of FIG. 29 can be realized by a plurality of satellites. It can be seen that since communication is performed between adjacent orbits, a communication route in the east-west direction with respect to Earth can be secured and communication can be performed by the shortest route. In FIG. 29, thick lines such as L21, L22, L23, and L24 are images representing examples of adjacent orbital planes. Thick dotted lines are image illustrations representing examples of communication between adjacent orbits.

Figure 30:
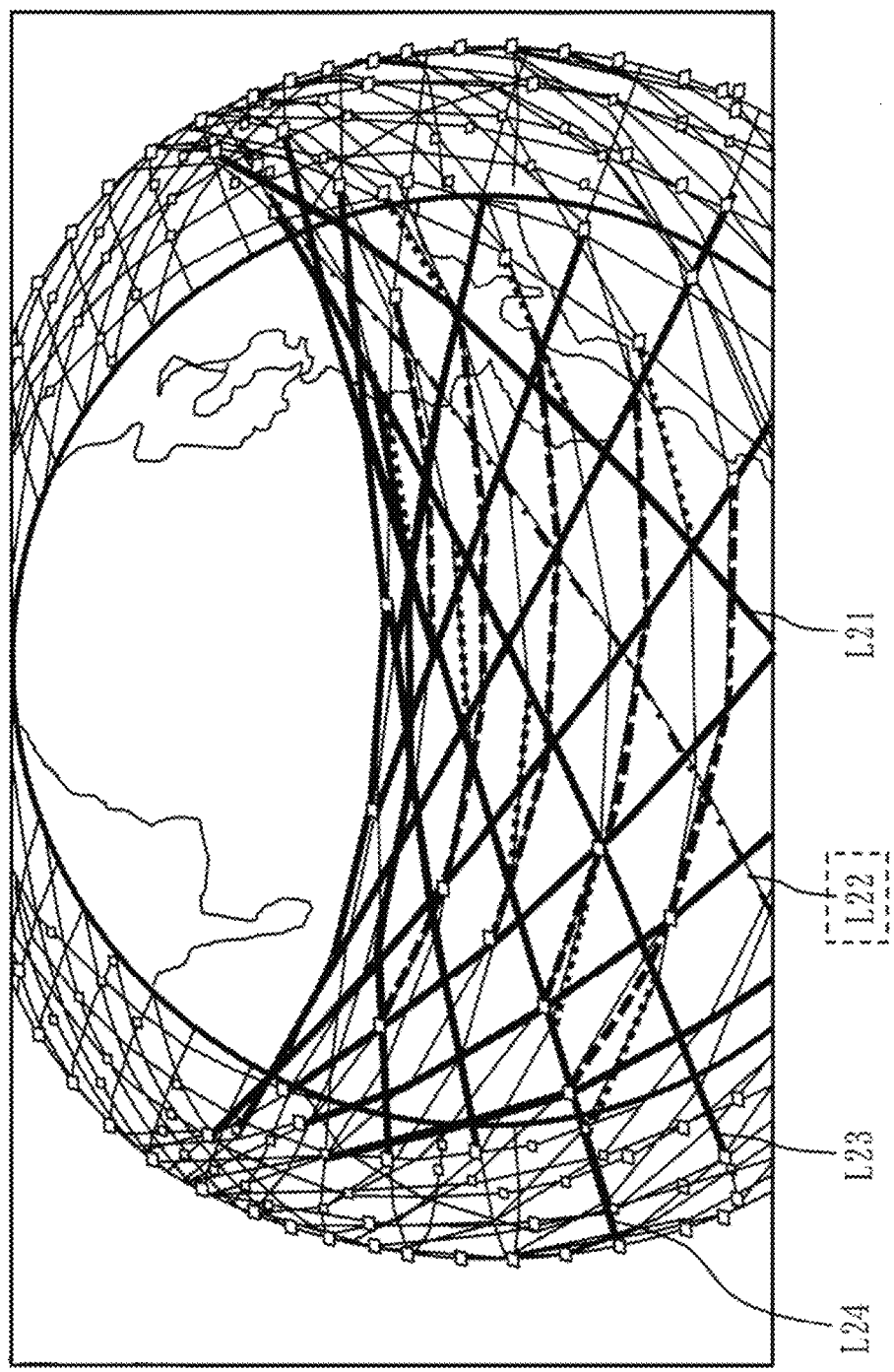
FIG. 30 is an image of inter-satellite communication in orbital planes spaced unevenly, and is a diagram illustrating a state in which there is no adjacent communication in an unevenly spaced region.

FIG. 30 is an image of an inter-satellite communication network when orbital planes are spaced unevenly, and is a diagram illustrating a state without adjacent communication in an unevenly spaced region.

FIG. 30 represents an example in which orbital planes are spaced unevenly according to this embodiment. It is assumed that due to the uneven spacing of orbital planes, a vacant region is generated at the orbital plane indicated as L22 in FIG. 29. In FIG. 30, the orbital plane of the vacant region is represented by a thick dash-dot-dash line. FIG. 30 represents an example in which communication in the forward and backward diagonal directions between adjacent orbits using the orbital plane represented by L22 in FIG. 29, which is now covered up by the thick dash-dot-dash line, is shut off.

It can be seen that the communication route in the east-west direction is still secured by the communication network using other orbital planes.

Figure 31:
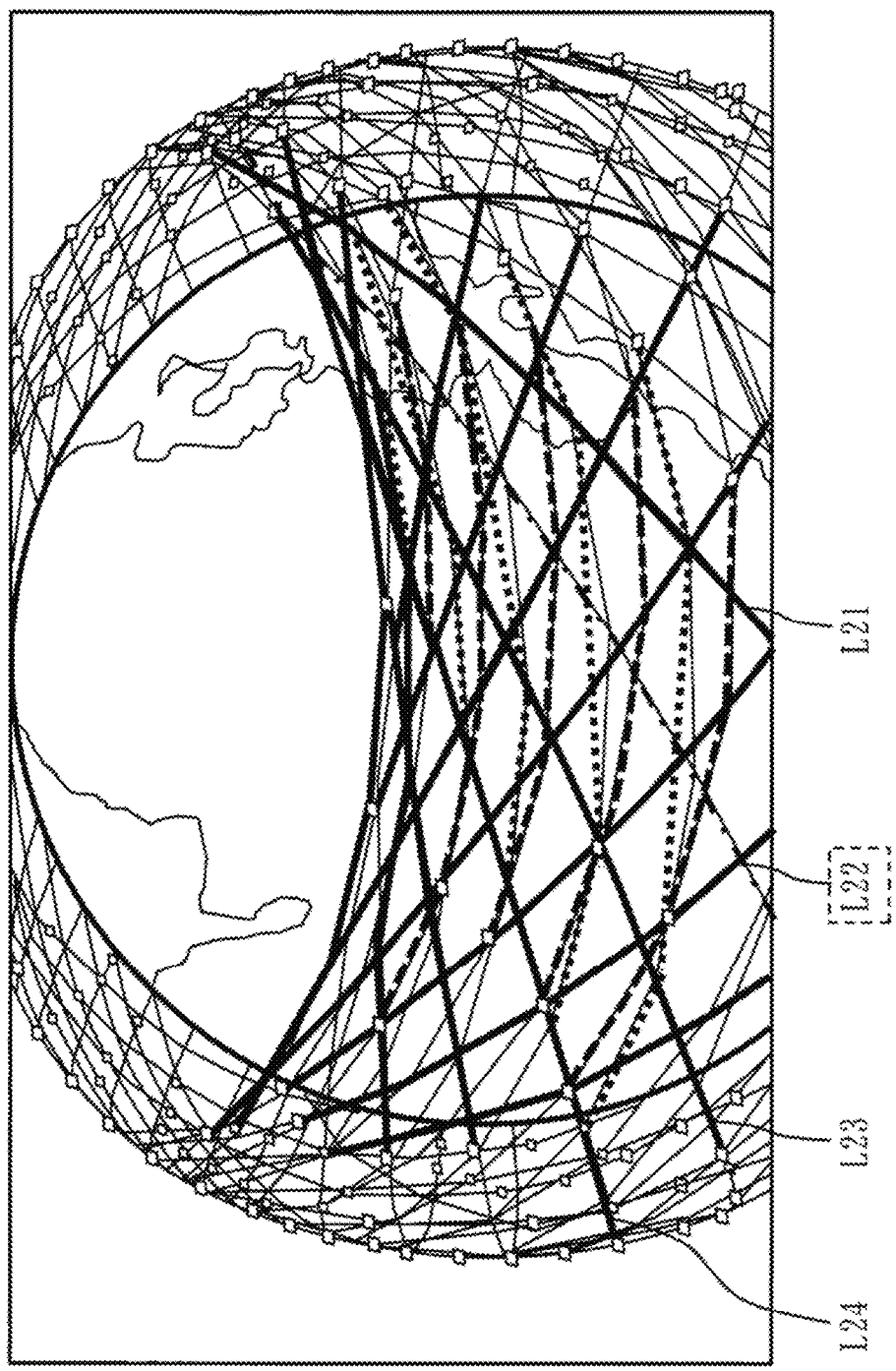
FIG. 31 is an example in which inter-satellite communication in forward and backward diagonal directions is performed between adjacent orbital planes L21 and L23 in a region that is vacant in FIG. 31.

FIG. 31 illustrates an example in which inter-satellite communication in the forward and backward diagonal directions is performed between the adjacent orbital planes L21 and L23 in the region that is vacant in FIG. 31. In the case of inter-satellite optical communication, a laser optical beam has little attenuation that depends on the communication distance, so that it is likely that this level of increase in the communication distance can be dealt with without changing communication mission devices.

Description of Effects of this Embodiment

With the satellite constellation forming system according to this embodiment, substantially the same effects as those of Embodiment 1 can be expected. That is, when a space object that is going to descend in orbit from a higher altitude does not have autonomous control capability and it is predicted in orbit analytical prediction that the space object will pass through the outside of a vacant region of orbital planes spaced unevenly, the mega-constellation business operator can change the location of uneven spacing in advance. Therefore, with the satellite constellation forming system according to this embodiment, there is an effect that a collision can be avoided by letting a space object pass through the vacant region. By synchronizing all satellites, that is, causing the satellite group to simultaneously to ascend or descend in orbit, there is an effect that a communication service can be continued without interrupting the service.

In Embodiments 1 and 2, the following business devices have been described.

A business device is a business device of a satellite constellation business operator that manages a satellite constellation.

The business device of the satellite constellation business operator includes the satellite constellation forming system or the ground facility described in Embodiments 1 and 2. The business device of the satellite constellation business operator executes the satellite constellation forming method or the satellite constellation forming program.

In Embodiments 1 and 2 above, each unit of the satellite constellation forming system has been described as an independent functional block. However, the configuration of the satellite constellation forming system may be different from the configurations described in the above embodiments. The functional blocks of the satellite constellation forming system may be arranged in any configuration, provided that the functions described in the above embodiments can be realized. The satellite constellation forming system may a single device or a system composed of a plurality of devices.

Portions of Embodiments 1 and 2 may be implemented in combination. Alternatively, one portion of these embodiments may be implemented. These embodiments may be implemented as a whole or partially in any combination.

That is, in Embodiments 1 and 2, portions of Embodiments 1 and 2 may be freely combined, or any constituent element may be modified. Alternatively, in Embodiments 1 and 2, any constituent element may be omitted.

The embodiments described above are essentially preferable examples and are not intended to limit the scope of the present disclosure, the scope of applications of the present disclosure, and the scope of uses of the present disclosure. The embodiments described above can be modified in various ways as necessary.

REFERENCE SIGNS LIST 11, 11b: satellite constellation forming unit; 20: satellite constellation; 21: orbital plane; 30: satellite; 31: satellite control device; 32: satellite communication device; 33: propulsion device; 34: attitude control device; 35: power supply device; 55: orbit control command; 60: space object; 70: Earth; 300: satellite group; 600: satellite constellation forming system; 700: ground facility; 510: orbit control command generation unit; 520: analytical prediction unit; 909: electronic circuit; 910: processor; 921: memory; 922: auxiliary storage device; 930: input interface; 940: output interface; 950: communication device; R: passage region.

The invention claimed is:

1. A satellite constellation forming system to form a satellite constellation which is composed of a satellite group and in which the satellite group cooperatively provides a communication service, the satellite constellation having a plurality of orbital planes in each of which a plurality of satellites fly at a same orbital altitude, wherein each satellite of the satellite group includes an inter-satellite communication device and a satellite-ground communication device, the satellite constellation forming system comprising:
    processing circuitry configured to:
        form the satellite constellation such that the plurality of orbital planes includes ten or more orbital planes with different normal directions; and
        form a passage region for a space object to pass through in the satellite constellation such that:
            a first set of adjacent orbital planes of the plurality of orbital planes is set,
            a first angle between the first set of adjacent orbital planes in an azimuth direction is set,
            a second set of adjacent orbital planes of the plurality of orbital planes is set,
            a second angle between the second set of adjacent orbital planes in the azimuth direction is set, and the first angle is different from the second angle resulting in the first set of adjacent orbital planes being spaced unevenly, wherein the satellite-ground communication devices of the satellites flying in the orbital planes that are spaced unevenly have a communication range that achieves complete ground coverage above the equator.

2. The satellite constellation forming system according to claim 1, wherein the processing circuitry is configured to cause the satellite group to simultaneously ascend or descend in orbital altitude so as to move the orbital planes that are spaced unevenly.

3. A satellite constellation forming method of a satellite constellation forming system to form a satellite constellation which is composed of a satellite group and in which the satellite group cooperatively provides a communication service, the satellite constellation having a plurality of orbital planes in each of which a plurality of satellites fly at a same orbital altitude, wherein each satellite of the satellite group includes an inter-satellite communication device and a satellite-ground communication device, the satellite constellation forming method comprising:

forming the satellite constellation such that the plurality of orbital planes includes ten or more orbital planes with different normal directions; and forming a passage region for a space object to pass through in the satellite constellation such that:
  a first set of adjacent orbital planes of the plurality of orbital planes is set,
  a first angle between the first set of adjacent orbital planes in an azimuth direction is set,
  a second set of adjacent orbital planes of the plurality of orbital planes is set,
  a second angle between the second set of adjacent orbital planes in the azimuth direction is set, and
  the first angle is different from the second angle resulting in the first set of adjacent orbital planes being spaced unevenly, wherein the satellite-ground communication devices of the satellites flying in the orbital planes that are spaced unevenly have a communication range that achieves complete ground coverage above the equator.

4. A ground facility included in a satellite constellation forming system to form a satellite constellation which is composed of a satellite group and in which the satellite group cooperatively provides a communication service, the satellite constellation having a plurality of orbital planes in each of which a plurality of satellites fly at a same orbital altitude, wherein each satellite of the satellite group includes an inter-satellite communication device and a satellite-ground communication device, the ground facility comprising:

processing circuitry configured to:
  form the satellite constellation such that the plurality of orbital planes includes ten or more orbital planes with different normal directions; and
  form a passage region for a space object to pass through in the satellite constellation such that:
    a first set of adjacent orbital planes of the plurality of orbital planes is set,
    a first angle between the first set of adjacent orbital planes in an azimuth direction is set,
    a second set of adjacent orbital planes of the plurality of orbital planes is set,
    a second angle between the second set of adjacent orbital planes in the azimuth direction is set, and
    the first angle is different from the second angle resulting in the first set of adjacent orbital planes being spaced unevenly, wherein the satellite-ground communication devices of the satellites flying in the orbital planes that are spaced unevenly have a communication range that achieves complete ground coverage above the equator.

5. A business device of a satellite constellation business operator that manages a satellite constellation, wherein the business device of the satellite constellation business operator executes the satellite constellation forming method according to claim 3.

6. The satellite constellation forming system according to claim 1, wherein the processing circuitry is configured to form the passage region such that the first angle is different from the second angle in response to determining that unevenly spaced orbital planes are to be formed.

7. The satellite constellation forming system according to claim 6, wherein the processing circuitry is configured to determine that the unevenly spaced orbital planes are to be formed when the space object will pass through the orbital altitude of the satellite constellation.

8. The satellite constellation forming system according to claim 1, wherein the processing circuitry is configured to cause all of the satellites in the first set of adjacent orbital planes to simultaneously change their orbital altitude.

9. The satellite constellation forming system according to claim 1, wherein the processing circuitry is configured to cause the satellite group to simultaneously ascend in orbital altitude while maintaining a state in which average orbital altitudes of the plurality of orbital planes are raised in a sequential order.

10. The satellite constellation forming method according to claim 3, wherein the method includes forming the passage region such that the first angle is different from the second angle in response to determining that unevenly spaced orbital planes are to be formed.

11. The satellite constellation forming method according to claim 10, wherein the method includes determining that the unevenly spaced orbital planes are to be formed when the space object will pass through the orbital altitude of the satellite constellation.

12. The satellite constellation forming method according to claim 3, further comprising causing all of the satellites in the first set of adjacent orbital planes to simultaneously change their orbital altitude.

13. The satellite constellation forming method according to claim 3, further comprising causing the satellite group to simultaneously ascend in orbital altitude while maintaining a state in which average orbital altitudes of the plurality of orbital planes are raised in a sequential order.

14. The ground facility according to claim 4, wherein the processing circuitry is configured to form the passage region such that the first angle is different from the second angle in response to determining that unevenly spaced orbital planes are to be formed.

15. The ground facility according to claim 14, wherein the processing circuitry is configured to determine that the unevenly spaced orbital planes are to be formed when the space object will pass through the orbital altitude of the satellite constellation.

16. The ground facility according to claim 4, wherein the processing circuitry is configured to cause all of the satellites in the first set of adjacent orbital planes to simultaneously change their orbital altitude.

17. The ground facility according to claim 4, wherein the processing circuitry is configured to cause the satellite group to simultaneously ascend in orbital altitude while maintaining a state in which average orbital altitudes of the plurality of orbital planes are raised in a sequential order.

* * * * *